US011388553B2

(12) United States Patent
Arai et al.

(10) Patent No.: US 11,388,553 B2
(45) Date of Patent: Jul. 12, 2022

(54) INFORMATION PROCESSING METHOD AND INFORMATION PROCESSING SYSTEM

(71) Applicant: Panasonic Intellectual Property Corporation of America, Torrance, CA (US)

(72) Inventors: Toshiya Arai, Osaka (JP); Takahiro Yoneda, Osaka (JP); Yuta Shimotsuma, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 57 days.

(21) Appl. No.: 17/071,225

(22) Filed: Oct. 15, 2020

(65) Prior Publication Data

US 2021/0029510 A1 Jan. 28, 2021

Related U.S. Application Data

(63) Continuation of application No. PCT/JP2019/037768, filed on Sep. 26, 2019.

(30) Foreign Application Priority Data

Oct. 5, 2018 (JP) .............................. JP2018-189775
May 27, 2019 (JP) .............................. JP2019-098800

(51) Int. Cl.
*H04W 4/029* (2018.01)
*H04W 4/48* (2018.01)
(Continued)

(52) U.S. Cl.
CPC ........... *H04W 4/029* (2018.02); *H04W 4/021* (2013.01); *H04W 4/024* (2018.02); *H04W 4/48* (2018.02); *H04W 28/0215* (2013.01); *G08G 1/20* (2013.01)

(58) Field of Classification Search
CPC ....... H04W 4/029; H04W 4/024; H04W 4/48; H04W 4/021; H04W 28/0215
(Continued)

(56) References Cited

U.S. PATENT DOCUMENTS 9,557,183 B1 * 1/2017 Ross ...................... G06Q 50/30
9,612,123 B1 * 4/2017 Levinson ............... G01C 21/26
(Continued)

FOREIGN PATENT DOCUMENTS

JP 2002-94971 3/2002
JP 2017-147626 8/2017
(Continued)

OTHER PUBLICATIONS

International Search Report dated Nov. 26, 2019 in International (PCT) Application No. PCT/JP2019/037768.
(Continued)

*Primary Examiner* — Kerri L McNally
(74) *Attorney, Agent, or Firm* — Wenderoth, Lind & Ponack, L.L.P.

(57) ABSTRACT

An information processing method performed using a computer includes: obtaining first position information indicating a first position, the first position being a position of a vehicle that is a monitoring target; obtaining second position information indicating a second position, the second position being a position in which the vehicle is requested to be monitored; determining a monitoring priority level of the vehicle according to movement information relating to movement of the vehicle from the first position to the second position; generating presentation information for monitoring the vehicle, based on the monitoring priority level; and causing a presentation device to output the presentation information.

17 Claims, 13 Drawing Sheets

(51) Int. Cl.
　　　*H04W 28/02*　　(2009.01)
　　　*H04W 4/021*　　(2018.01)
　　　*H04W 4/024*　　(2018.01)
　　　*G08G 1/00*　　(2006.01)

(58) Field of Classification Search
　　　USPC .......................................................... 340/994
　　　See application file for complete search history.

(56) References Cited

U.S. PATENT DOCUMENTS

2017/0225567 A1　　8/2017　Tsuda
2018/0375939 A1*　12/2018　Magalhães de Matos ..................
　　　　　　　　　　　　　　　　　　　　　　　　　　　G08G 1/22

FOREIGN PATENT DOCUMENTS

JP　　　　2018-32433　　　3/2018
WO　　　2018/102477　　　6/2018

OTHER PUBLICATIONS

Extended European Search Report dated Sep. 7, 2021 in European Patent Application No. 19868905.1.

* cited by examiner

FIG. 4

| PRIORITY LEVEL | SITUATION INFORMATION |
|---|---|
| 23 | OCCURRENCE OF ACCIDENT OF OWN VEHICLE |
| 13 | SUDDEN START |
| 18 | OCCURRENCE OF CALL |
| 3 | TIME SCHEDULE SLIPPAGE |
| 4 | RAILROAD CROSSING, PEDESTRIAN CROSSING, JUNCTION, SEPARATION, INTERSECTION |
| 8 | BLOCKING OF VEHICLES BEHIND, OCCURRENCE OF TRAFFIC CONGESTION CAUSED BY OWN VEHICLE |
| ⋮ | ⋮ |

FIG. 5

| WORK TIME | SITUATION INFORMATION |
|---|---|
| 10 SECONDS | RAILROAD CROSSING, SEPARATION |
| 20 SECONDS | PEDESTRIAN CROSSING |
| 30 SECONDS | JUNCTION, INTERSECTION |
| 40 SECONDS | OCCURRENCE OF TRAFFIC CONGESTION CAUSED BY OWN VEHICLE |
| ⋮ | ⋮ |

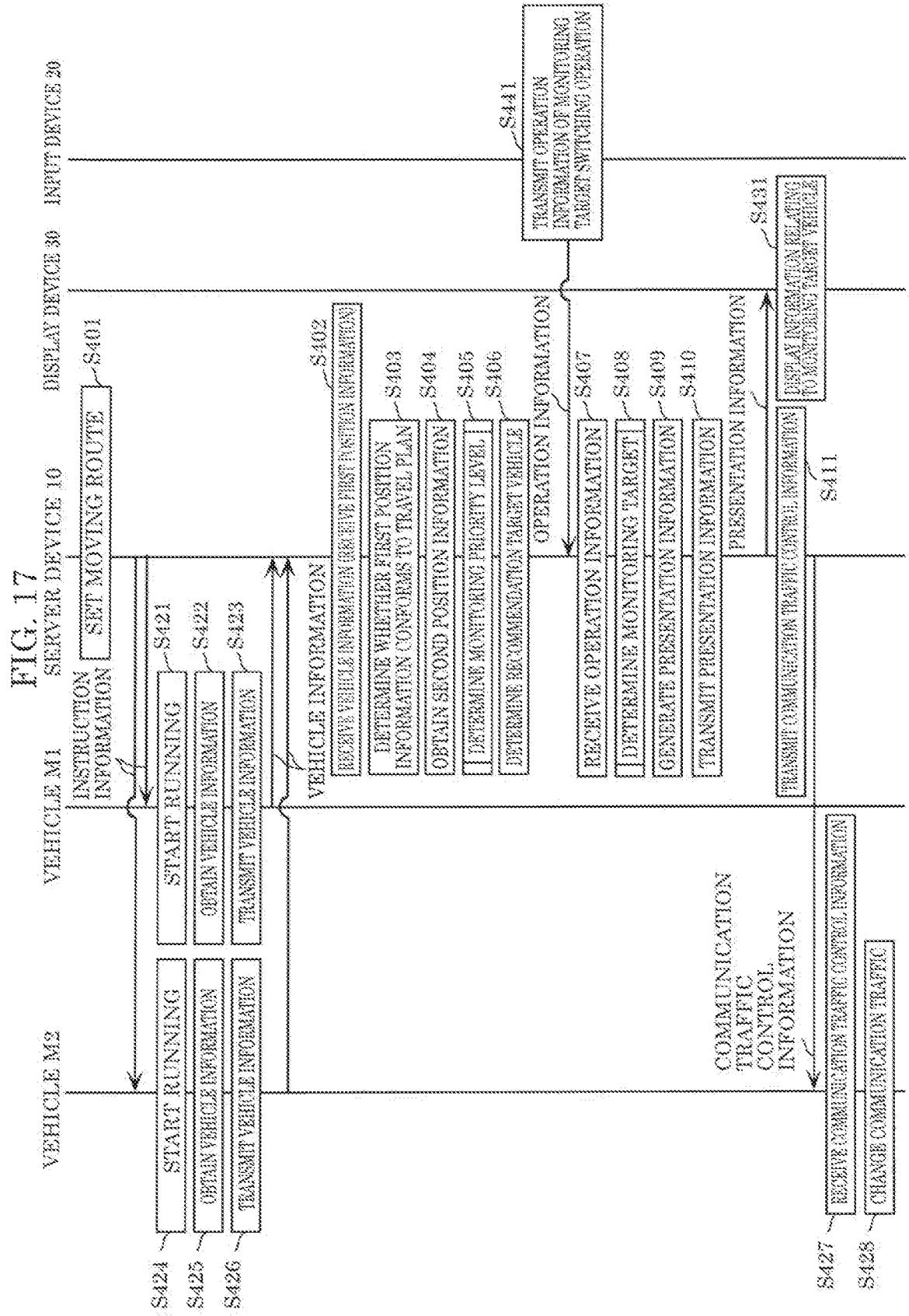

INFORMATION PROCESSING METHOD AND INFORMATION PROCESSING SYSTEM

CROSS REFERENCE TO RELATED APPLICATIONS

This application is a U.S. continuation application of PCT International Patent Application Number PCT/JP2019/037768 filed on Sep. 26, 2019, claiming the benefit of priority of Japanese Patent Application Number 2018.189775 filed on Oct. 5, 2018 and Japanese Patent Application Number 2019-098800 filed on May 27, 2019, the entire contents of which are hereby incorporated by reference.

BACKGROUND

1. Technical Field

The present disclosure relates to an information processing method and an information processing system.

2. Description of the Related Art

There are remote operation systems in which operators at remote locations indirectly operate driverless vehicles or vehicles capable of autonomous running without being operated by drivers, using wireless communication such as a wireless local area network (LAN) or a mobile phone line.

In such a remote operation system, sensing results obtained by observing the surroundings of a vehicle using various sensors such as a millimeter-wave radar, a laser radar, and a camera mounted in the vehicle are transmitted from the vehicle (hereafter referred to as "operated vehicle") to an operator via a communication means. The operator recognizes the state of the operated vehicle and the state of the surroundings of the operated vehicle based on the transmitted sensing results, determines how to control the operated vehicle, and examines a method of controlling the vehicle. The operator then transmits, to the operated vehicle, a control signal relating to running of the vehicle, thus remotely controlling the operated vehicle.

For example, Japanese Unexamined Patent Application Publication No. 2017-147626 discloses a technique of remotely operating each vehicle present within a remote operation target area, i.e. an area in which vehicles are requested to be remotely operated. With this technique, an operator needs to remotely operate a vehicle only within the limited range of the remote operation target area, so that the time for continuous remote operation of the vehicle can be shortened. This reduces the remote operation load on the operator.

SUMMARY

With the conventional technique disclosed in Japanese Unexamined Patent Application Publication No. 2017-147626, prior to the operation of the operated vehicle by the operator, the operated vehicle is monitored by the operator or a monitor, other than the operator, who does not perform the operation (hereafter the operator and the monitor are also collectively referred to as "monitor"). Given that when and where a dangerous situation such as an accident occurs are unknown, the monitor needs to monitor all scenes if possible, and thus is under a heavy monitoring load. It is therefore desirable to reduce the monitoring load on the monitor. Japanese Unexamined Patent Application Publication No. 2017-147626 discloses a method for reducing the load on the operator who remotely operates the vehicle, but does not disclose a method for reducing the monitoring load on the monitor who remotely monitors the vehicle.

The present disclosure has an object of providing an information processing method and an information processing system that can reduce a monitoring load on a monitor.

An information processing method according to an aspect of the present disclosure is an information processing method performed using a computer, including: obtaining first position information indicating a first position, the first position being a position of a vehicle that is a monitoring target; obtaining second position information indicating a second position, the second position being a position in which the vehicle is requested to be monitored; determining a monitoring priority level of the vehicle according to movement information relating to movement of the vehicle from the first position to the second position; generating presentation information for monitoring the vehicle, based on the monitoring priority level; and causing a presentation device to output the presentation information.

An information processing system according to an aspect of the present disclosure is an information processing system using a computer, including: a first obtainer that obtains first position information indicating a first position, the first position being a position of a vehicle that is a monitoring target; a second obtainer that obtains second position information indicating a second position, the second position being a position in which the vehicle is requested to be monitored; a determiner that determines a monitoring priority level of the vehicle according to movement information relating to movement of the vehicle from the first position to the second position; and a presentation controller that generates presentation information for monitoring the vehicle based on the monitoring priority level, and causes a presentation device to output the presentation information.

A program according to an aspect of the present disclosure causes a computer to execute the foregoing information processing method.

These general and specific aspects may be implemented using a system, a method, an integrated circuit, a computer program, or a computer-readable recording medium such as CD-ROM, or any combination of systems, integrated circuits, computer programs, and recording media.

An information processing method and an information processing system according to the present disclosure can reduce a monitoring load on a monitor.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram illustrating an example of a priority level table stored in a travel DB according to the embodiment;

FIG. 5 is a diagram illustrating an example of a work information table stored in the travel DB according to the embodiment;

FIG. 17 is a sequence diagram illustrating a process by a monitoring system according to a variation of the embodiment.

DETAILED DESCRIPTION OF THE EMBODIMENT

Figure 1:
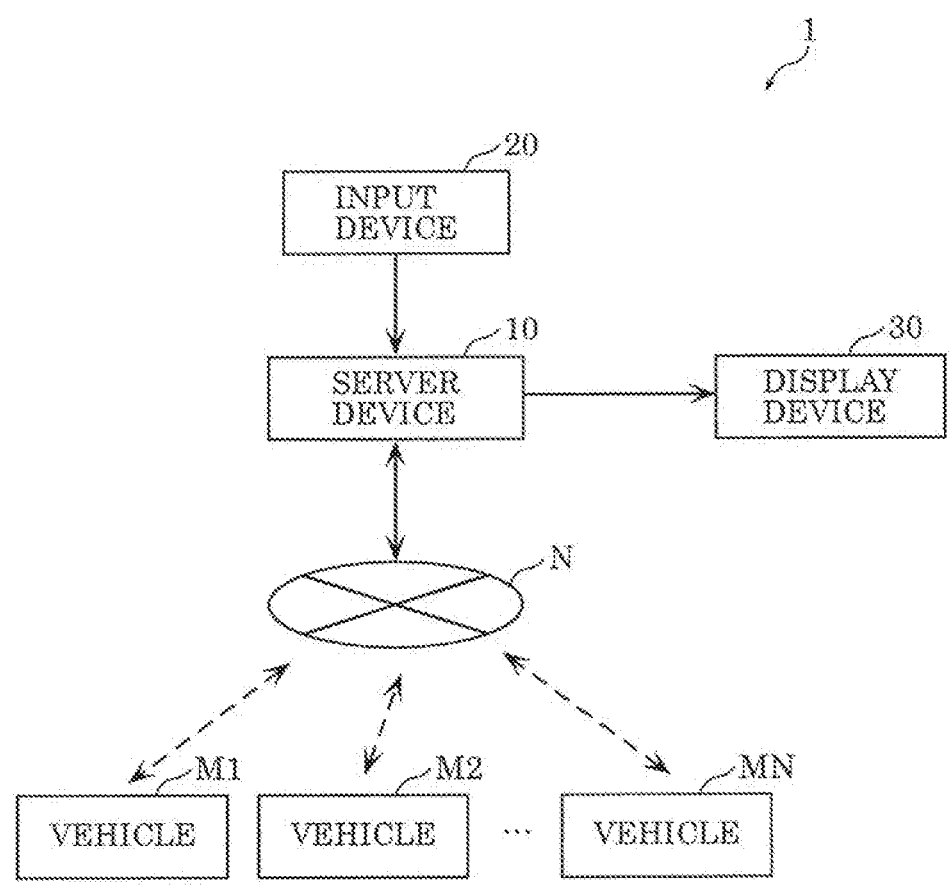
FIG. 1 is a block diagram illustrating a structure of a monitoring system according to an embodiment.

An information processing method according to an aspect of the present disclosure is an information processing method performed using a computer, including: obtaining first position information indicating a first position, the first position being a position of a vehicle that is a monitoring target; obtaining second position information indicating a second position, the second position being a position in which the vehicle is requested to be monitored; determining a monitoring priority level of the vehicle according to movement information relating to movement of the vehicle from the first position to the second position; generating presentation information for monitoring the vehicle, based on the monitoring priority level; and causing a presentation device to output the presentation information.

Thus, a monitor can determine whether the vehicle is requested to be monitored, by checking the presentation information output by the presentation device. That is, the monitor can determine whether the vehicle is requested to be monitored, without constantly monitoring the vehicle and without analyzing the situation of the vehicle in detail. The running environment of the vehicle differs depending on position, and influences safe running of the vehicle. As a result of the presentation information being presented based on the monitoring priority level according to the relationship between the position in which monitoring is requested and the position of the vehicle, the monitor can consult the presentation information for monitoring. Thus, the information processing method according to an aspect of the present disclosure can reduce the monitoring load on the monitor. Specifically, the information processing method according to an aspect of the present disclosure can reduce the load of monitoring all images and the load of determining the request for monitoring the vehicle.

The movement information may include at least one of a travel time from the first position to the second position, a distance from the first position to the second position, and a running route from the first position to the second position.

Thus, the monitoring priority level can be determined using, as the movement information, at least one of travel time, distance, and running route. Hence, the monitoring priority level can be determined according to the time allowance before the vehicle reaches the position in which monitoring is requested. By checking the presentation information based on the monitoring priority level, the monitor can specify a vehicle to be preferentially monitored. The monitoring load on the monitor can thus be reduced. Herein, the travel time denotes the time required for the vehicle to move from the first position to the second position.

The movement information may include the travel time, and the determining may include determining the monitoring priority level according to the travel time.

Thus, the monitor can easily determine whether monitoring is requested, by checking the presentation information corresponding to the travel time. That is, the monitor can specify a vehicle to be preferentially monitored from time perspective. Therefore, the monitor can perform monitoring more efficiently, so that the monitoring load on the monitor can be further reduced.

The information processing method may further include: obtaining a difficulty level of running in the second position, wherein the determining includes determining the monitoring priority level according to the difficulty level and the travel time.

Thus, the monitor can more accurately specify a vehicle to be preferentially monitored according to the situation in the second position, by checking the presentation information that further takes into account the difficulty level of running in the second position. The monitoring load on the monitor can thus be further reduced.

The second position may include a location specified from at least one of geographical information and traffic information.

Thus, the monitoring priority level that takes into account the geographical information and/or the traffic information can be determined. The degree of request for monitoring is influenced by the static geographical situation or the dynamic traffic situation. Therefore, as a result of the presentation information being presented based on the monitoring priority level that takes into account the geographical information and/or the traffic information, the monitor can consult the presentation information for monitoring. For example, the geographical information includes the road shape (e.g. intersection, curve, junction, slope, high-accident location), and the traffic information includes the dynamic road situation (e.g. traffic congestion information). Hence, the monitor can more appropriately determine a vehicle to be preferentially monitored, according to at least one of the static information at the second position and the dynamic information at the second position. The monitoring load on the monitor can thus be further reduced.

The second position may include a location in which a person gets on or off a vehicle.

Thus, the presentation information is generated by taking into account the movement information to the location (e.g. bus stop, or location of getting on or off the vehicle) where there is a risk of contact with a person on the running route of the vehicle. By checking the presentation information, the monitor can determine a vehicle to be preferentially monitored based on the movement information to the location where there is a risk of contact with a person. The monitoring load on the monitor can thus be further reduced.

The second position may include a location in which an object that satisfies a predetermined condition is situated.

Thus, the monitoring priority level can be determined according to the positional relationship with the object that satisfies the predetermined condition. The degree of request for monitoring is influenced not only by the geographical situation or the traffic situation but also by any object situated at the position. As a result of the presentation information that takes into account the position of the object that satisfies the predetermined condition being presented, the monitor can consult the presentation information for monitoring. The monitoring load on the monitor can thus be further reduced.

The predetermined condition may include a condition that the object has a possibility of obstructing running of the vehicle, and the information processing method may comprise: specifying the object from sensing data of the vehicle or a vehicle around the vehicle.

Thus, the presentation device can present the presentation information that takes into account the position of the object having a possibility of obstructing running of the vehicle. In the surroundings of the object having a possibility of obstructing running of the vehicle, the degree of request for monitoring the vehicle is likely to be high. As a result of the presentation information being presented, the monitor can consult the presentation information for monitoring. Examples of the object having a possibility of obstructing running of the vehicle include a vehicle allowed to run with priority over other vehicles (e.g. emergency vehicle), a vehicle having difficulty in moving (e.g. vehicle involved in an accident), a vehicle violating the running rules (e.g. reckless driving vehicle), a vehicle likely to obstruct the sensing of the vehicle (e.g. large-size vehicle), and a vehicle in special form (e.g. special work vehicle).

The information processing method may further include: obtaining work information relating to work of a monitor according to a difficulty level of running in the second position, wherein the determining includes determining the monitoring priority level according to the movement information and the work information.

Thus, the monitor can determine whether the vehicle is requested to be monitored, by checking the presentation information that further takes into account the work information. That is, the monitor can specify a vehicle to be preferentially monitored, further from the perspective of the work for monitoring the vehicle. Therefore, the monitor can perform monitoring more efficiently, so that the monitoring load on the monitor can be further reduced.

The work information may include a work time that is at least one of a work time required to monitor the vehicle and a work time required to operate the vehicle, the movement information may include the travel time, and the determining may include determining the monitoring priority level according to the travel time and the work time.

Thus, the monitor can determine whether the vehicle is requested to be monitored, by checking the presentation information that takes into account the travel time and the work time. That is, the monitor can specify a vehicle to be preferentially monitored, from the perspective of the total time of the time for the vehicle to reach the second position from the current position and the time to complete monitoring or operation. For example, the monitor can secure, before the vehicle reaches the second position, a time required for monitoring or operation of the vehicle in the second position, and then monitor the vehicle. The monitoring load on the monitor can thus be further reduced.

The information processing method may further include: obtaining the difficulty level of running in the second position, wherein the determining includes determining the monitoring priority level according to a difference between the travel time and the work time and the difficulty level.

Thus, the monitor can determine whether the vehicle is requested to be monitored, by checking the presentation information that further takes into account the difference between the travel time and the work time and the difficulty level of running in the second position. The monitoring load on the monitor can thus be further reduced.

The obtaining of the first position information may include obtaining the first position information from each of a plurality of the vehicles, the obtaining of the second position information may include obtaining, for each of the plurality of the vehicles, the second position information indicating the second position that is the position in which the vehicle is requested to be monitored, the determining may include determining, for each of the plurality of the vehicles, the monitoring priority level using the first position information and the second position information, and the presentation information may include information for monitoring a vehicle specified according to respective monitoring priority levels of the plurality of the vehicles.

Thus, the monitor can know which of the plurality of vehicles is requested to be monitored, by checking the presentation information output by the presentation device. That is, the monitor can know which vehicle is requested to be monitored, without constantly monitoring all of the plurality of vehicles and without analyzing the situations of all of the plurality of vehicles in detail. Hence, in the case where there are a plurality of monitoring target vehicles, the effect of reducing the monitoring load on the monitor can be further exhibited. Moreover, since a plurality of vehicles can be monitored by one person, a plurality of vehicles can be monitored by fewer persons than the vehicles. This reduces costs such as labor cost and facility cost for monitoring.

The presentation information may include information indicating, as the monitoring target, the vehicle specified.

Thus, the presentation device presents information of the vehicle that is requested to be monitored by the monitor from among the plurality of vehicles. That is, the vehicle that is requested to be monitored is directly indicated. Since the monitor can easily specify the vehicle that is requested to be monitored, the monitoring load on the monitor can be further reduced.

The presentation information may include information for presenting the information for monitoring the vehicle specified according to a monitoring priority level thereof from among the plurality of the vehicles with more emphasis than information for monitoring a vehicle other than the vehicle specified.

Thus, even in the case where information of the plurality of vehicles are presented by the presentation device, the monitor can easily gain information of a vehicle that requires attention from among the plurality of vehicles. For example, in the case where images of the plurality of vehicles are displayed in sizes corresponding to the respective monitoring priority levels, the monitor can visually know the vehicle that requires attention based on its image size. Thus, even in the case where the information of the plurality of vehicles are presented by the presentation device, the monitoring load on the monitor can be reduced.

Herein, the expression "vehicle that requires attention" denotes a vehicle having a high monitoring priority level.

The obtaining of the first position information may include obtaining the first position information through communication with the vehicle, and the information processing method may further include: controlling communication traffic of the communication according to the monitoring priority level.

Thus, communication with the vehicle can be optimized according to the monitoring priority level. For example, the communication traffic, communication count, communication frequency, communication time, etc. with a vehicle having a low monitoring priority level can be reduced. Thus, the monitoring load on the monitor can be reduced while reducing use of network bandwidth for communication with the vehicle depending on the monitoring priority level.

The causing may include causing the presentation device to output the presentation information before the vehicle reaches the second position.

Thus, the monitor can recognize a vehicle that is likely to be requested to be monitored, before the timing at which monitoring is requested.

An information processing system according to an aspect of the present disclosure is an information processing system using a computer, including: a first obtainer that obtains first position information indicating a first position, the first position being a position of a vehicle that is a monitoring target; a second obtainer that obtains second position information indicating a second position, the second position being a position in which the vehicle is requested to be monitored; a determiner that determines a monitoring priority level of the vehicle according to movement information relating to movement of the vehicle from the first position to the second position; and a presentation controller that generates presentation information for monitoring the vehicle based on the monitoring priority level, and causes a presentation device to output the presentation information.

This information processing system has the same effects as the foregoing information processing method.

These general and specific aspects may be implemented using a system, an apparatus, an integrated circuit, a computer program, or a computer-readable recording medium such as CD-ROM, or any combination of systems, apparatuses, integrated circuits, computer programs, and recording media.

An embodiment will be described in detail below, with reference to the drawings.

The embodiment described below shows a general and specific example. The numerical values, shapes, materials, structural elements, the arrangement and connection of the structural elements, steps, the order of steps, etc. shown in the following embodiments are mere examples, and do not limit the scope of the present disclosure. Of the structural elements in the embodiments described below, the structural elements not recited in any one of the independent claims representing the broadest concepts are described as optional structural elements.

Embodiment

An information processing method, etc. according to this embodiment will be described below, with reference to FIGS. 1 to 16.

A remote monitoring system (hereafter also simply referred to as "monitoring system") obtains a sensing result from a monitored vehicle via a communication means, and notifies the sensing result to a monitor. The monitor recognizes the state of the monitored vehicle and the state of the surroundings of the monitored vehicle based on the notified sensing result, and determines whether intervention of an operator is requested for the monitored vehicle. The monitor may examine an appropriate intervention method, including a method whereby the operator indirectly controls the monitored vehicle. In the case where the monitor determines that autonomous running of the monitored vehicle is difficult, the monitor requests the operator to perform remote operation. The operator transmits a control signal relating to vehicle running to the monitored vehicle (i.e. operated vehicle), to remotely control the monitored vehicle. In the case where the operator is the monitor, the operator may directly shift from monitoring to operation.

Structure of Monitoring System

A monitoring system including a server device that executes the information processing method according to this embodiment will be described below, with reference to FIGS. 1 to 13.

Figure 2:
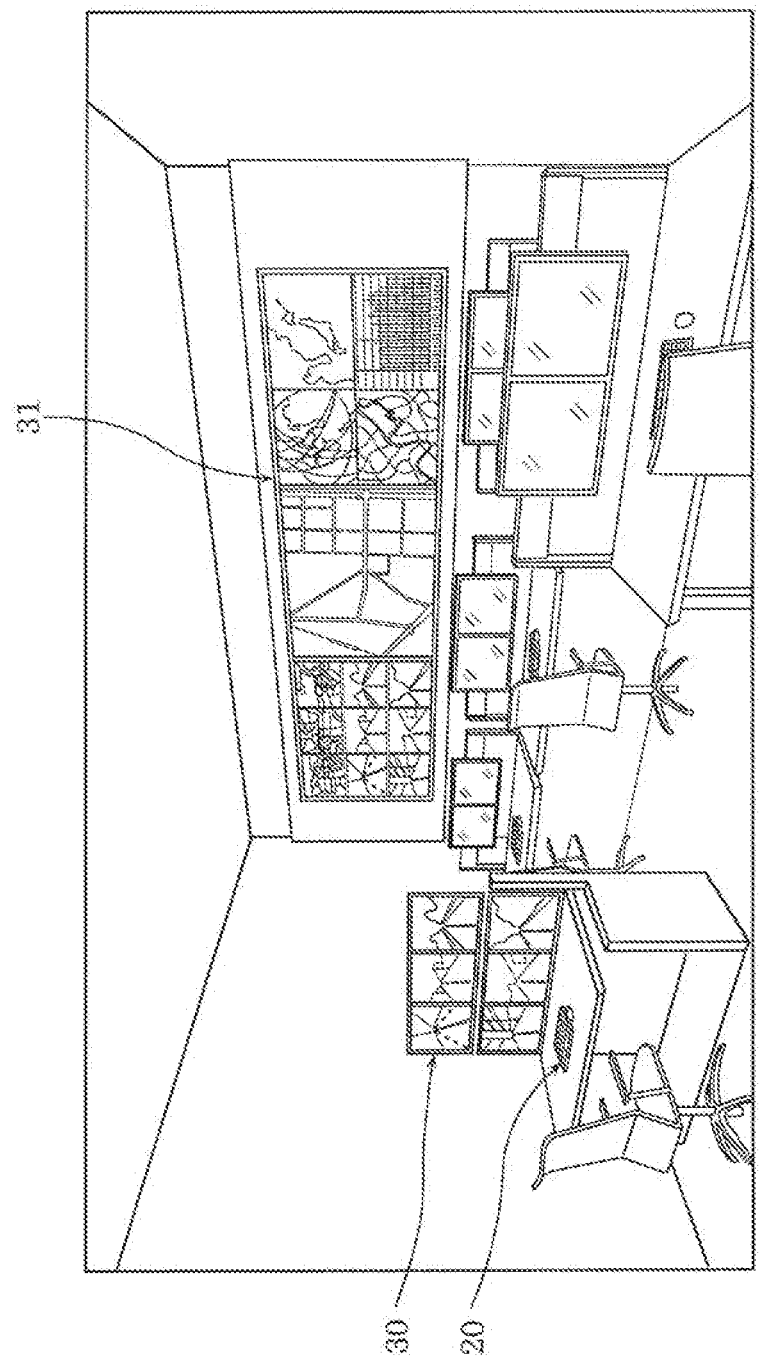
FIG. 2 is a schematic view of an example of a monitoring room according to the embodiment.

FIG. 1 is a block diagram illustrating a structure of monitoring system 1 according to this embodiment. FIG. 2 is a schematic view of an example of a monitoring room according to this embodiment.

Monitoring system 1 illustrated in FIG. 1 is an information processing system for monitoring vehicles M1, M2, . . . , and MN any of which can be an operated vehicle. Vehicles M1, M2, . . . , and MN are hereafter also referred to as "vehicles M1, etc.". The monitoring room illustrated in FIG. 2 is a room for monitoring vehicles M1, etc. by a monitor. In the monitoring room, information obtained from vehicles M1, etc. and information for monitoring vehicles M1, etc. are presented to the monitor, to enable the monitor to perform an operation for monitoring. In addition to the operation for monitoring by the monitor, an operation for remotely operating the operated vehicle may be performed. The monitor may be an operator who operates the operated vehicle, or a person other than the operator. Although an example in which monitoring system 1 is an information processing system that monitors the plurality of vehicles M1, etc. is described here, the number of vehicles monitored by monitoring system 1 is not limited. For example, monitoring system 1 may be an information processing system that monitors one vehicle.

As illustrated in FIG. 1, monitoring system 1 includes server device 10, input device 20, and display device 30.

Server device 10 is a processing device that performs determination relating to monitoring by the monitor. Specifically, server device 10 performs monitoring-related determination, by information processing by a computer using input to input device 20 and vehicle information obtained from vehicles M1, etc. The present disclosure has a feature that server device 10 determines, for each of vehicles M1, etc., a monitoring priority level indicating the degree of priority of monitoring using position information (an example of first position information) of the vehicle included in vehicle information obtained from the vehicle, and generates and outputs presentation information for monitoring the vehicle based on the monitoring priority level. This will be described in detail later.

Server device 10 is installed in a site communicably connectable to network N, and the physical position of server device 10 is not limited. For example, installing server device 10 in or near the monitoring room is advantageous for fast communication with input device 20 and display device 30.

Input device 20 is an input device that receives input of operation by the monitor. Input device 20 may be a keyboard, a mouse, a touch panel, etc. connected to server device 10, or may be buttons operable by press, touch, etc. Input device 20 provides information relating to the input operation to server device 10. Input device 20 is installed in the monitoring room. In the case where server device 10 is in a remote location, input device 20 and server device 10 may be connected via a network.

Display device 30 is a device that obtains the presentation information from server device 10 and outputs the presentation information as an image. The image includes photographs, illustrations, text, etc. Display device 30 is, for example, a liquid crystal display. The image output by display device 30 is visually recognized by the monitor, and used when determining, for example, whether the monitor is to monitor a vehicle, which vehicle is to be monitored by the monitor, and/or how to monitor the vehicle. Display device 30 is an example of a presentation device. Monitoring system 1 may include a sound output device as a presentation device, in addition to or instead of display device 30. Display device 30 is installed in the monitoring room. In the case where server device 10 is in a remote location, display device 30 and server device 10 may be connected via a network.

Vehicle M1 is a vehicle with or without any occupant, and is, for example, an automatic driving vehicle. Vehicle M1 is a vehicle that can be subjected to monitoring by the monitor. Vehicle M1 is present in an external space other than the monitoring room. For example, vehicle M1 is present on a road or in a parking space.

Vehicle M1 includes a communication interface. Vehicle M1 is connected to network N through communication, and communicably connected to server device 10 via network N. Vehicle M1 includes one or more cameras that image the surroundings of vehicle M1, and a plurality of sensors that detect the position, speed, acceleration, jerk, steering angle, remaining fuel amount or remaining battery level, direction indicator activation state, ABS (anti-lock braking system) or AEB (automatic emergency braking) activation state of vehicle M1, the position, presence/absence, number, and type of any object in the surroundings of vehicle M1, and the distance, speed difference, and acceleration difference of vehicle M1 from the surrounding object. Vehicle M1 transmits information including image data generated as a result of imaging by the one or more cameras and sensing data such as the position of vehicle M1 and the position of the surrounding object obtained by the plurality of sensors, to server device 10 via the communication interface and network N. This information transmitted by vehicle M1 is also referred to as "vehicle information". The foregoing various information transmitted as the vehicle information are also referred to as "vehicle information types". That is, the vehicle information per se may be of a plurality of types. Vehicle M1 can be subjected to acceleration/deceleration control, steering angle control, and the like by the monitor via network N, according to need. Such control by the monitor is also referred to as "remote operation".

The vehicle information may further include life/death information indicating whether the plurality of sensors are in operation, error information such as information about system errors of vehicle M1, call information for calling the monitor from an occupant of vehicle M1, and the like. In the case where vehicle M1 stores map information, the vehicle information may further include legal speed at the position where vehicle M1 is running, information indicating the positional relationship of vehicle M1 with traffic lanes, and/or information relating to a moving route set by vehicle M1.

In the vehicle information, the information of the position, etc. of vehicle M1, the error information, the call information, the legal speed, the information indicating the positional relationship with traffic lanes, the moving route, and the like are an example of information indicating a running state of vehicle M1, and the information of the presence/absence of the surrounding object and the like are an example of information indicating a state outside vehicle M1. The vehicle information includes at least the information indicating the position of vehicle M1. The position of vehicle M1 is an example of a first position, and information indicating the first position is an example of first position information. The first position denotes, for example, the current position of vehicle M1.

Vehicle M1 may further include a sound collection device (not illustrated) that collects sound around vehicle M1, as a sensor. For example, the sound collection device includes a microphone. From sound (e.g. sound of a siren) around vehicle M1 collected by the microphone, an emergency vehicle (e.g. ambulance, fire engine, or police car) running or stopped in the surroundings of vehicle M1 may be detected. The emergency vehicle is an example of an object that satisfies a predetermined condition. The predetermined condition includes a condition that the object has a possibility of obstructing running of vehicle M1, such as in the case where running of an emergency vehicle takes precedence over running of a non-emergency vehicle. The means of detection of the emergency vehicle is not limited to the sound collection device, and the emergency vehicle may be detected, for example, through image analysis for an image captured by the one or more cameras.

A vehicle having running difficulty (e.g. a vehicle involved in an accident, or a vehicle stopped due to a trouble) may be specified from an image captured by the one or more cameras or sensing data obtained by the plurality of sensors. The vehicle having running difficulty is an example of an object that satisfies a predetermined condition. The predetermined condition includes a condition that the object has a possibility of obstructing running of vehicle M1, such as in the case where a vehicle other than vehicle M1 has difficulty in moving.

The foregoing object that satisfies the predetermined condition may be specified by vehicle M1, etc. In this case, the vehicle information may include information such as the type, position, and speed of the object that satisfies the predetermined condition. A location in which the object that satisfies the predetermined condition is situated is an example of a second position that is a position in which vehicles M1, etc. are requested to be monitored by the monitor. The foregoing object that satisfies the predetermined condition may be detected by server device 10. In this case, the sensing data in the vehicle information may include sound information or the like. The predetermined condition may be a condition other than the above, as long as it is a condition the object has a possibility of affecting running of vehicle M1. For example, the predetermined condition may be a condition that the object runs at a predetermined speed or more. In this case, the object that satisfies the predetermined condition may be a dangerous vehicle engaged in dangerous running.

Thus, the second position may be a position specified from the sensing data. For example, the second position may be a location specified from at least one of geographical information and traffic information (described in detail later). The second position may include, for example, a location of a railroad crossing, a pedestrian crossing, a junction, a separation, a curve, and/or the top of a slope. The second position may include a location in which a vehicle stops erroneously, a location in which a person gets on or off a vehicle, and/or a location of a station. The station is a facility for vehicle refueling, battery charging, and the like. The second position is a location in a running route of the vehicle.

Vehicles M2 to MN are each the same vehicle as vehicle M1, and each move independently of vehicle M1. Vehicles M2 to MN each transmit image data and sensing data generated by its device to server device 10, in the same way as vehicle M1.

Network N is a communication network to which each of server device 10 and vehicles M1, etc. is connected. A non-limiting example of a communication standard or communication scheme of network N is a wide area communication network using a mobile phone network, a satellite communication network, or Wi-Fi. Connection with vehicles M1, etc. is wireless.

Input device 20 and display device 30 are located in the monitoring room. Input device 20 and display device 30 are located so that the monitor can easily perform input and visual recognition. For example, input device 20 and display device 30 are located on a desk in front of a chair on which the monitor sits. Display device 31 that displays images of image data obtained by vehicles M1, etc., a map indicating the positions of vehicles M1, etc. and the like is located so as to be visible from the entire monitoring room. For example, display device 31 displays images based on image data obtained from all of vehicles M1, M2, . . . , and MN any of which can be an operated vehicle. For example, display device 31 is connected to server device 10, and displays images for all vehicles transmitted from server device 10. The displayed images are visually recognized by the monitor.

The number of monitors may be two or more. The number of monitors may be smaller than the number of vehicles M1, etc. The monitor is expected to select and monitor only a vehicle (or vehicles) determined to be requested to be monitored without monitoring the other vehicles, rather than constantly monitoring all vehicles M1, etc. This has the advantage that the number of personnel necessary for monitoring can be reduced and the monitor can concentrate on monitoring the vehicle that is requested to be monitored. A vehicle is determined to be requested to be monitored, for example, in the case where the vehicle is in a dangerous position, in the case where the vehicle is in a dangerous state, in the case where the vehicle is approaching a dangerous position, or in the case where the vehicle is predicted to be in a dangerous state. The number of monitors may be one, or the same as the number of vehicles M1, etc.

The monitor visually recognizes images presented by display device 30, and determines which of vehicles M1, etc. is to be monitored and how to monitor the vehicle. The monitor inputs a vehicle as a monitoring target or a monitoring method to server device 10 via input device 20. For example, display device 30 presents an image of a vehicle that is a monitoring target of the monitor from among vehicles M1, M2, . . . , and MN any of which can be an operated vehicle, an image for selecting a vehicle to be monitored, and the like.

A process by which server device 10 generates information for recommending the monitor as to which vehicle is subjected to monitoring (i.e. monitoring target) will be described in detail below. In this case, the monitor determines which vehicle is to be monitored, based on information presented by display device 30. If the monitoring target recommended by server device 10 is appropriate, the load of work of the monitor for searching for a monitoring target from among vehicles M1, etc. can be reduced.

Figure 3:
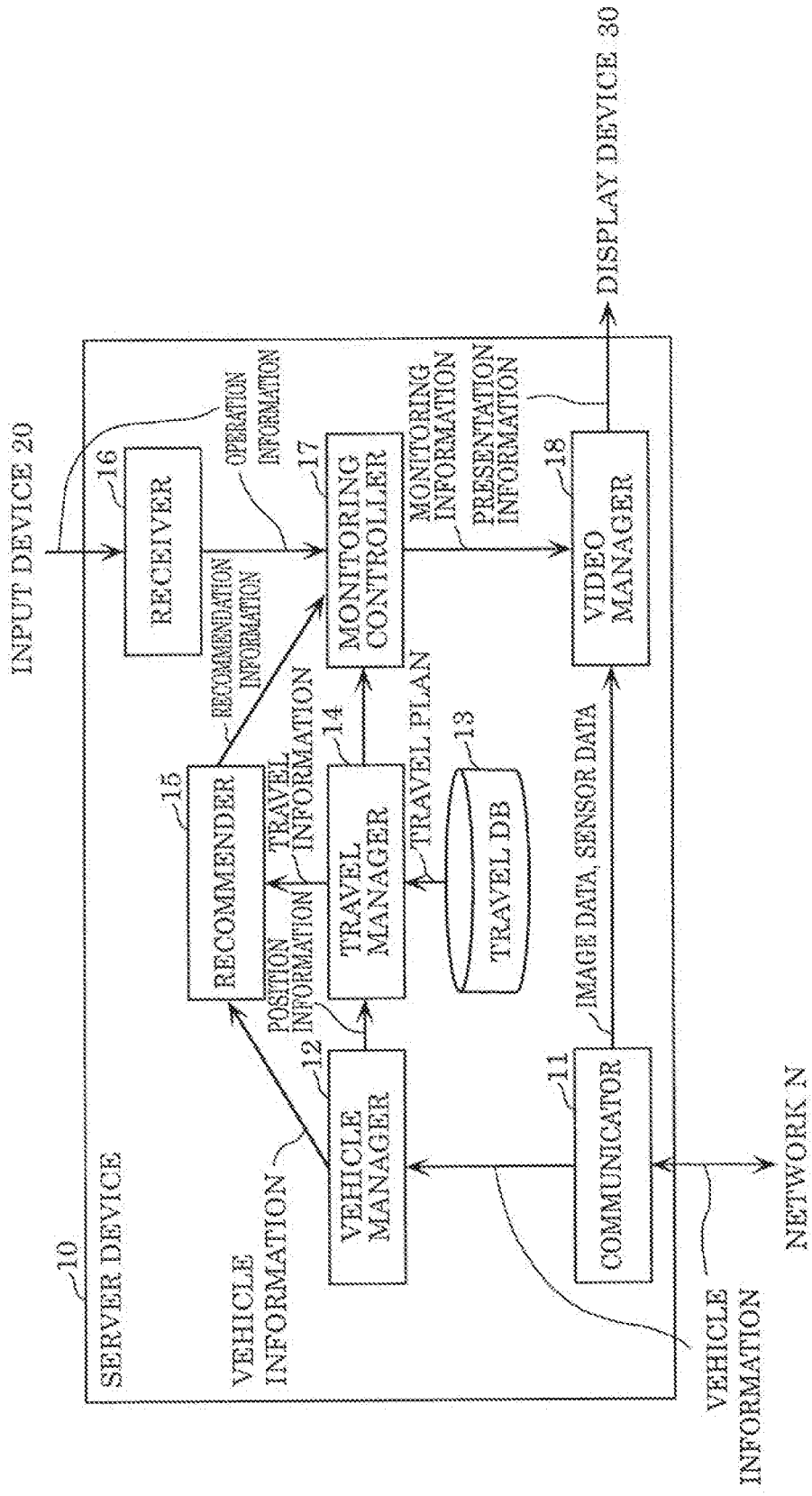
FIG. 3 is a block diagram illustrating a functional structure of a server device according to the embodiment.

FIG. 3 is a block diagram illustrating a functional structure of server device 10 according to this embodiment.

As illustrated in FIG. 3, server device 10 includes communicator 11, vehicle manager 12, travel database (DB) 13, travel manager 14, recommender 15, receiver 16, monitoring controller 17, and video manager 18.

Communicator 11 is a communication interface that is connected to network N and communicable connected to vehicles M1, etc. via network N. Communicator 11 obtains vehicle information from vehicles M1, etc.

Vehicle manager 12 is a processing unit that manages vehicles M1, etc. Vehicle manager 12 obtains the vehicle information transmitted by vehicles M1, etc., and manages the position, speed, running state, and the like of each of vehicles M1, etc. based on the obtained vehicle information.

Travel DB 13 is a database that stores information for travel of each of vehicles M1, etc. Travel DB 13 holds information of a map, traffic, and a travel plan, as the information for travel of each of vehicles M1, etc. The travel plan includes information indicating a moving route by which the vehicle is scheduled to run, and information indicating a position at which the vehicle is scheduled to be present on the route at each point in time during running.

The map information includes geographical information such as information relating to topography and road layout and position information (e.g. position specified based on route and latitude) of road incidental elements. Examples of the road incidental elements include division lines (roadway center lines, traffic lane boundaries, roadway outside lines, etc.) marked on roads to demarcate guideways in the width direction and structures (traffic lights, road signs, guardrails, etc.) near the roads.

The geographical information may include statistical risk information (e.g. accident or near-miss history information) in running, which is accumulated in association with position information on the map. The geographical information may include risk information (e.g. intersections or curves) based on map shape (e.g. road shape). The geographical information herein includes static information. The geographical information may also include locations in which persons gets on or off vehicles. For example, the geographical information may include information of a location in which a bus stop or the like is situated, a destination location of the vehicle, and the like. A location involving risk based on running or map shape or a location in which a person gets on or off a vehicle on the map is an example of a second position. Further, the geographical information includes information relating to a risk value in the second position. The geographical information may include, for example, a priority level indicating a monitoring priority in the second position.

The traffic information includes traffic congestion information, event information, and the like on the map. The event information may include information relating to events such as festivals or sports days, information relating to time such as commuting hours to and from nearby schools, and information relating to running such as traffic control. The traffic information herein includes dynamic information that can vary from moment to moment or in real time.

Server device 10 may obtain the foregoing geographical information and traffic information from a device outside server device 10, and store the obtained information in travel DB 13.

Travel DB 13 also stores a table (priority level table) in which a plurality of items of situation information of each of vehicles M1, etc. based on vehicle information are each associated with a degree of request for monitoring the vehicle by the monitor in the situation of the situation information. Travel DB 13 also stores a table (work information table) in which the plurality of items of situation information are each associated with a time (also referred to as "work time") required to monitor the vehicle in the situation of the item of situation information.

Each type of table stored in travel DB 13 will be described below, with reference to FIGS. 4 and 5. Travel DB 13 stores at least work information table T2 out of priority level table T1 and work information table T2 described below.

FIG. 4 is a diagram illustrating an example of priority level table T1 stored in travel DB 13 according to this embodiment.

As illustrated in FIG. 4, priority level table T1 is a table associating priority levels and items of situation information of a vehicle with each other. In priority level table T1, a plurality of items of situation information of the vehicle are set, and a priority level is set for each item of situation information of the vehicle.

Herein, each priority level is a numeric value according to the degree of request for monitoring the vehicle by the monitor. For example, a higher numeric value indicates a higher degree of request for monitoring by the monitor. That is, the priority level is a numeric value according to the degree to which running by automatic driving is hindered, and indicates the magnitude of risk associated with automatic driving or associated with continuing automatic driving. The priority level is a numeric value based on vehicle information.

Each item of situation information of the vehicle may be information indicating a situation of the vehicle based on the vehicle information. For example, "occurrence of accident of own vehicle" is information indicating a situation of the vehicle determined based on the running state, image, acceleration, and the like. In the case where the vehicle and an object around the vehicle are in contact with each other in an image, for example, "occurrence of accident of own vehicle" is detected. For example, "sudden start" is information indicating a situation of the vehicle determined based on the image, acceleration, and the like. In the case where the acceleration in a predetermined period when the vehicle starts to move from a stopped state is higher than or equal to a predetermined value, for example, "sudden start" is detected.

Each item of situation information of the vehicle may be information based not only on the vehicle information but also the travel plan including the moving route of the vehicle. For example, "time schedule slippage" is information indicating a situation of the vehicle determined based on the position information of the vehicle included in the vehicle information, the travel plan, and the like. In the case where the current position of the vehicle is at least a predetermined distance away from the current scheduled position of the vehicle included in the travel plan, for example, "time schedule slippage" is detected. For example, "railroad crossing" is information indicating a situation of the vehicle determined based on the position information of the vehicle included in the vehicle information, the geographical information, and the like. In the case where the current position of the vehicle is within a predetermined range from a railroad crossing, for example, "railroad crossing" is detected. Detection of situation information is performed by recommender 15.

In FIG. 4, the five items of situation information (hereafter also referred to as "danger information") from "occurrence of accident of own vehicle" to "time schedule slippage" are information indicating that the vehicle is in a dangerous situation, and the two items of situation information (hereafter also referred to as "caution information") from "railroad crossing" to "occurrence of traffic congestion caused by own vehicle" are information indicating that the vehicle is likely to be in a dangerous situation in the future. The caution information indicates a situation in which running by automatic driving is possible as there is no problem in vehicle running.

Each priority level in FIG. 4 may be a value weighted by a weight (coefficient) corresponding to situation information. For example, "occurrence of accident of own vehicle" is a situation that immediately requires monitoring by the monitor and is assigned a high weight, and therefore its priority level is high. On the other hand, "time schedule slippage" is a situation that does not require monitoring as urgently as "occurrence of accident of own vehicle" and is assigned a low weight, and therefore its priority level is low. Specifically, each priority level may be set based on the degree of request for monitoring by the monitor and the weight that correspond to a corresponding one of the plurality of items of situation information each of which indicates a situation of the vehicle based on the vehicle information. The weight may be determined, for example, according to the seriousness of an accident that can occur in the situation of the corresponding situation information or the accident occurrence rate. The accident occurrence rate is the probability that an event (e.g. accident) which is requested to be handled by the monitor occurs if the situation of the vehicle (e.g. "occurrence of traffic congestion caused by own vehicle") is left unattended.

FIG. 5 is a diagram illustrating an example of work information table T2 stored in travel DB 13 according to this embodiment.

As illustrated in FIG. 5, work information table T2 is a table associating work times and items of situation information of a vehicle with each other. In work information table T2, a plurality of items of situation information of the vehicle are set, and a work time is set for each item of situation information of the vehicle. The types of situation information of the vehicle set in work information table T2 indicate, for example, situations that can be obtained from the geographical information or the traffic information, and may be at least partially the same as the types of situation information of the vehicle set in priority level table T1. A position on the running route of vehicles M1, etc. corresponding to the situation of each item of situation information in FIG. 5 is a second position.

A work time is an example of work information relating to work of the monitor according to the difficulty level of running for each item of situation information, and includes at least one of the time required for the monitor to determine the situation and the time required for the monitor to respond to the situation. The time required for the monitor to determine the situation is, for example, the time required from when the monitor checks the image captured by the vehicle to when the monitor determine the situation around the vehicle. The time required for the monitor to determine the situation is, for example, the time required to recognize motion of a person at a pedestrian crossing in front of the vehicle. The time required for the monitor to respond to the situation is, for example, the time required to make an emergency stop of the vehicle or the time required to stop the vehicle at a road shoulder. For example, stopping the vehicle at a road shoulder requires a more complex operation and takes longer time than making an emergency stop of the vehicle. Although FIG. 5 illustrates an example in which the difficulty level of running is higher when the work time is longer, the present disclosure is not limited to such.

Work information table T2 may be set for each of a plurality of monitors. In this way, the monitoring priority level corresponding to the work time of each monitor can be determined. Although an example in which work information table T2 includes the work time is described here, work information table T2 may include the work amount or the work difficulty. That is, work information table T2 is a table associating at least one of the work time, the work amount, and the work difficulty and the situation information with each other.

Referring back to FIG. 3, travel manager 14 is a processing unit that manages travel of each of vehicles M1, etc. Travel manager 14 obtains information such as a travel plan of each of vehicles M1, etc. from travel DB 13, and transmits instruction information including a moving route of the vehicle to the vehicle M1. Travel manager 14 also determines travel information including information of how long the travel of the vehicle is delayed with respect to the travel plan. Travel manager 14 also obtains at least one of the geographical information and the traffic information from travel DB 13, and presents the obtained at least one of the geographical information and the traffic information to recommender 15.

Recommender 15 is a processing unit that generates information for recommending a vehicle as a monitoring target of the monitor to the monitor. Recommender 15 obtains, from vehicle manager 12, the vehicle information transmitted by each of vehicles M1, etc., and obtains, from travel manager 14, the travel information relating to the travel of the vehicle and at least one of the geographical information and the traffic information. Recommender 15 then generates recommendation information for recommending a vehicle as a monitoring target of the monitor to the monitor, based on the obtained vehicle information, travel information, and at least one of the geographical information and the traffic information. The recommendation information includes information specifying the vehicle that is subjected to recommendation for monitoring. For example, the recommendation information is represented by a monitoring priority level indicating the degree to which the vehicle is to be preferentially monitored as compared with the other vehicles. The recommendation information may be a monitoring recommendation level indicating the degree to which the vehicle is recommended as the monitoring target. Recommender 15 determines the monitoring priority level based on at least the vehicle information.

In the case where there is no vehicle as the monitoring target of the monitor (e.g. there is no vehicle whose monitoring priority level is higher than or equal to a predetermined threshold), recommender 15 may generate information indicating that no monitoring is requested. The information indicating that no monitoring is requested is included in the recommendation information. Recommender 15 is an example of a determiner.

Recommender 15 will be described in more detail below, with reference to FIG. 6.

Figure 6:
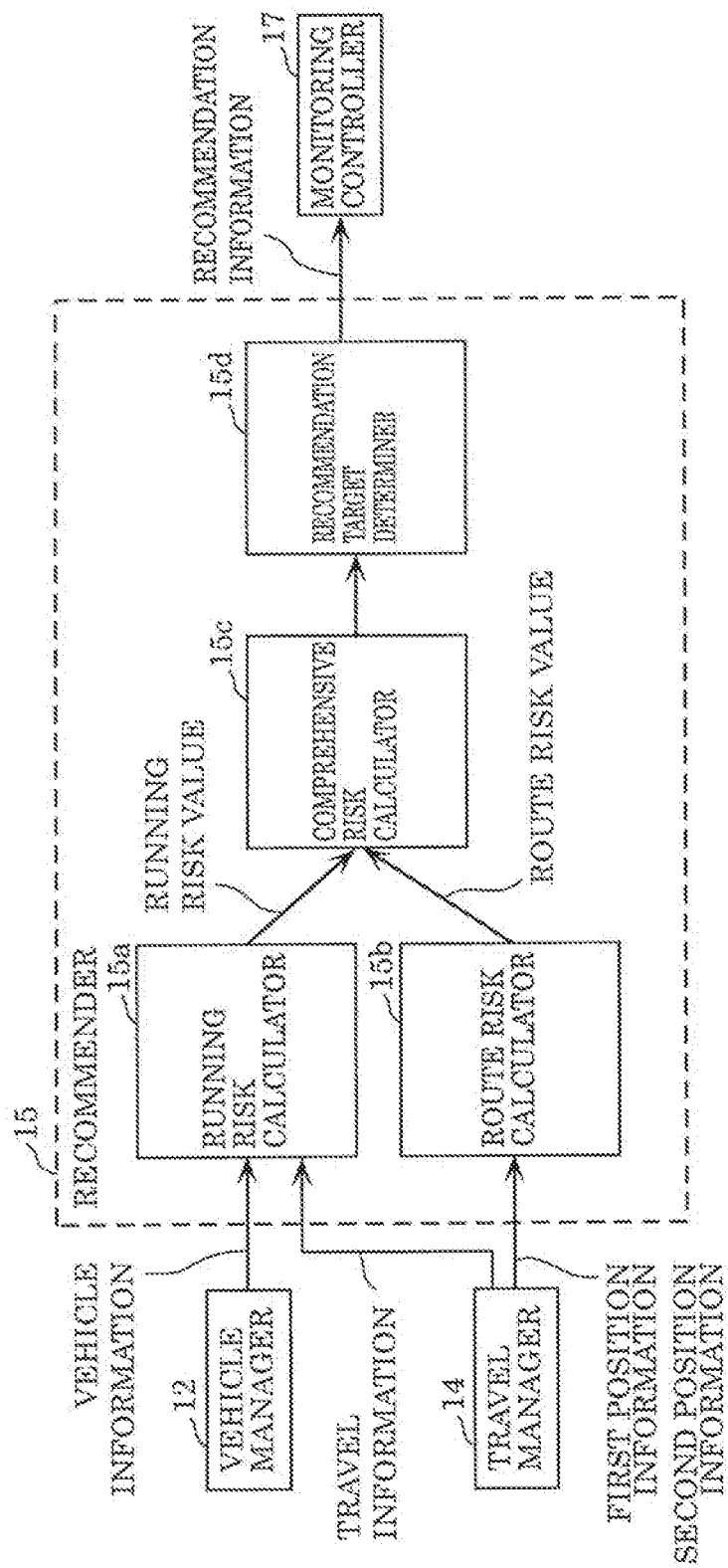
FIG. 6 is a block diagram illustrating a functional structure of a recommender according to the embodiment.

FIG. 6 is a block diagram illustrating a functional structure of recommender 15 according to this embodiment.

As illustrated in FIG. 6, recommender 15 includes running risk calculator 15a, route risk calculator 15b, comprehensive risk calculator 15c, and recommendation target determiner 15d.

Running risk calculator 15a is a processing unit that calculates a running risk value of each of vehicles M1, etc. from at least one of the vehicle information and the travel information. Running risk calculator 15a calculates the running risk value based on at least one of the vehicle information obtained from vehicle manager 12 and the travel information obtained from travel manager 14. The running risk value indicates the degree of request for monitoring by the monitor in the running of the vehicle, and is calculated as a priority level in this embodiment.

Running risk calculator 15a calculates the running risk value of each of vehicles M1, etc., based on the situation in the running of the vehicle according to the foregoing information and the priority level illustrated in FIG. 4.

Route risk calculator 15b is a processing unit that calculates a route risk value which is a risk value on the route of each of vehicles M1, etc., based on position-based information and at least one of the geographical information and the traffic information. Route risk calculator 15b calculates the route risk value of each of vehicles M1, etc., from the position information (an example of first position information) of the vehicle and at least one of the geographical information and the traffic information (an example of second position information). Route risk calculator 15b calculates the route risk value according to a first position indicated by first position information obtained from travel manager 14 and a second position that is a location specified from at least one of the geographical information and the traffic information. Route risk calculator 15b calculates the route risk value according to movement information (an example of position-based information) relating to the movement of the vehicle from the first position to the second position. The movement information is information obtained from the first position and the second position, and includes, for example, at least one of the travel time, distance, and running route from the first position to the second position. An example in which the movement information includes the travel time will be described below. The route risk value indicates the degree of request for monitoring by the monitor on the running route of the vehicle, and is calculated based on the travel time in this embodiment. Herein, the term "travel time" denotes the time required for vehicle M1 to move from the first position to the second position, which is calculated from the distance from the first position to the second position on the running route, the speed of the vehicle, and the like. In the case where the second position is a location in which a predetermined object (e.g. an object satisfying the below described predetermined condition) is situated and the predetermined object is moving, the travel time is calculated further from the speed of the predetermined object, and the like.

Route risk calculator 15b may calculate the route risk value of each of vehicles M1, etc., based on the first position information of the vehicle, the second position information based on the running route and at least one of the geographical information and the traffic information, and the work information (e.g. work time) illustrated in FIG. 5. That is, route risk calculator 15b may calculate the route risk value based on the work information in addition to the first position information and the second position information.

Comprehensive risk calculator 15c is a processing unit that calculates a comprehensive risk value which is a risk value of each of vehicles M1, etc., based on the running risk value calculated by running risk calculator 15a and the route risk value calculated by route risk calculator 15b. Comprehensive risk calculator 15c calculates a single risk value for each of vehicles M1, etc., by combining the running risk value and the route risk value by predetermined computation. The computation includes at least one of addition, subtraction, multiplication, and division. For example, comprehensive risk calculator 15c calculates the comprehensive risk value of each of vehicles M1, etc., by adding the running risk value and the route risk value. In this embodiment, comprehensive risk calculator 15c determines, as the comprehensive risk value, a monitoring priority level obtained by adding a priority level in running and a priority level in route. When combining the running risk value and the route risk value by the predetermined computation, comprehensive risk calculator 15c may multiply at least one of the running risk value and the route risk value by a predetermined weight (coefficient).

Recommendation target determiner 15d is a processing unit that determines a vehicle recommended as a monitoring target from the respective comprehensive risk values of vehicles M1, etc. obtained from comprehensive risk calculator 15c. Recommendation target determiner 15d may determine a vehicle (an example of an attention vehicle) having the highest monitoring priority level or a monitoring priority level higher than a threshold from among vehicles M1, etc., as the vehicle recommended as a monitoring target.

The number of vehicles recommended by recommendation target determiner 15d may be one, or two or more. For example, the number of vehicles recommended may be determined according to the monitoring ability of the monitor. In the case where there is no vehicle having a monitoring priority level higher than the threshold, for example, recommendation target determiner 15d may determine that there is no vehicle recommended. In this case, the recommendation information includes information indicating that there is no vehicle recommended.

Recommender 15 suffices to include structural elements for determining the recommendation target from the route risk value. That is, recommender 15 suffices to include route risk calculator 15b and recommendation target determiner 15d. The monitoring priority level is determined according to at least the route risk value. In detail, the monitoring priority level is determined according to at least the movement information (e.g. travel time) relating to the movement of the vehicle from the first position to the second position.

Referring back to FIG. 3, receiver 16 is a processing unit that receives operation information indicating input operation by the monitor input to input device 20. For example, the operation information includes monitoring target switching operation.

Monitoring controller 17 is a processing unit that determines a vehicle as a monitoring target. Monitoring controller 17 determines the vehicle as the monitoring target based on the recommendation information generated by recommender 15 and the operation information received by receiver 16, and generates monitoring information indicating the vehicle as the monitoring target. Monitoring controller 17 provides the generated monitoring information to video manager 18.

The monitoring information generated by monitoring controller 17 includes information specifying the vehicle as the monitoring target. The monitoring information may also include information indicating the reason why the vehicle is determined as the monitoring target. The monitoring information includes, for example, information indicating which of the plurality of items of situation information in FIG. 5 is detected. The monitoring information may include, for example, which of the plurality of items of situation information in FIG. 4 is detected. The monitoring information may further include the monitoring priority level.

Monitoring controller 17 has an automatic update mode and a manual update mode, as operation modes for determination of a monitoring target vehicle. The automatic update mode is a mode of determining the monitoring target vehicle according to the recommendation information and generating the monitoring information regardless of whether the operation information is received or the contents of the received operation information. The manual update mode is a mode of determining the monitoring target vehicle according to the operation information and generating the monitoring information regardless of whether there is recommendation information or the contents of the recommendation information.

Video manager 18 is a processing unit that manages video to be displayed on display device 30. Video manager 18 generates presentation information including image data relating to the video to be displayed on display device 30, and outputs the presentation information to display device 30. Video manager 18 obtains the monitoring information from monitoring controller 17, and, in the case where the monitoring information includes the information specifying the vehicle as the monitoring target, includes, in the presentation information, image data which communicator 11 has received from the monitoring target vehicle. Video manager 18 is an example of a presentation controller that generates presentation information and causes display device 30 to output the generated presentation information.

Specifically, the presentation information may include information indicating the vehicle as the monitoring target indicated in the monitoring information. In the case where the monitoring information includes information indicating one or more vehicles that can be the monitoring target, the presentation information may include the monitoring priority level of each of the one or more vehicles included in the monitoring information. In the case where the monitoring information includes information indicating a monitoring direction, the presentation information may include a captured image of the monitoring direction included in the monitoring information. In the case where there is no vehicle as the monitoring target of the monitor, the presentation information may include information indicating that no monitoring is requested.

Examples of the presentation information generated by video manager 18, i.e. displayed by display device 30, will be described below.

Figure 7:
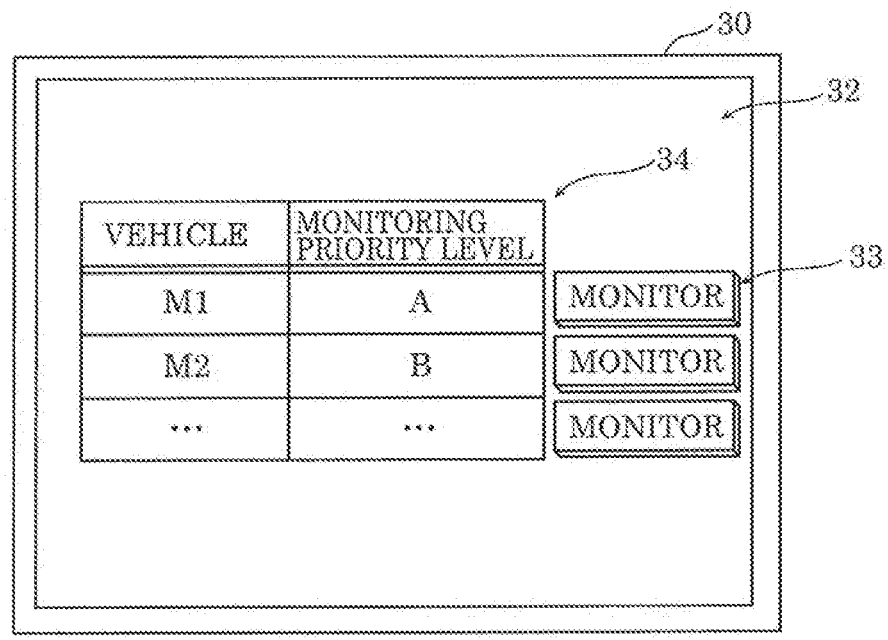
FIG. 7 is an explanatory diagram illustrating a first example of presentation information according to the embodiment.

FIG. 7 is an explanatory diagram illustrating a first example of presentation information according to this embodiment. FIG. 7 illustrates an example in which monitoring priority levels are presented as presentation information.

As illustrated in FIG. 7, image 32 displayed by display device 30 includes image 34 indicating the monitoring priority level of each of vehicles M1, etc. That is, video manager 18 causes display device 30 to present image 32 in which vehicles M1, etc. are associated with their monitoring priority levels. The monitoring priority levels are each information indicating the degree by which the vehicle is to be preferentially monitored. For example, the monitoring priority levels are expressed in three levels of A (high), B (medium), and C (low). For example, the monitoring priority level of vehicle M1 is A, and the monitoring priority level of vehicle M2 is B. Image 32 includes image 33 of each of respective buttons for starting monitoring of vehicles M1, etc. The monitoring priority levels may be numeric values. For example, the monitoring priority levels may each be a value obtained by adding together the priority levels corresponding to the detected items of situation information from among the plurality of items of situation information. An initial value of each monitoring priority level may be a predetermined value (e.g. 0). The initial value of the monitoring priority level means that there is no situation that requires immediate or future monitoring.

Thus, the monitor can easily determine which vehicle is to be monitored, by checking the respective monitoring priority levels of the plurality of vehicles. The monitor can know which vehicle is requested to be monitored, without analyzing the situations of all of the plurality of vehicles in detail.

The presentation information is, for example, information for monitoring vehicle M1 or the like specified according to the respective monitoring priority levels of the plurality of vehicles M1, etc. The presentation information may include information for preferentially presenting a vehicle whose monitoring priority level is high. The presentation information may include information for presenting respective items of information indicating the plurality of vehicles M1, etc. in order of their monitoring priority levels. The presentation information may include information for presenting respective items of information for monitoring vehicles specified according to their monitoring priority levels from among the plurality of vehicles M1, etc., in order of the monitoring priority levels of the plurality of specified vehicles. The presentation information may include information for presenting information indicating each vehicle specified according to the monitoring priority level from among the plurality of vehicles M1, etc. and the monitoring priority level of the specified vehicle in association with each other. The presentation information may include information for displaying the vehicles in descending order of monitoring priority level or in ascending order of monitoring priority level. FIG. 7 illustrates an example in which the vehicles are displayed in descending order of monitoring priority level.

The presentation information may include information for presenting information (an example of first information) for monitoring a vehicle specified according to the monitoring priority level from among the plurality of vehicles M1, etc. with more emphasis than information (an example of second information) for monitoring the vehicles other than the specified vehicle. For example, the presentation information may include information for presenting information (an example of first information) indicating a vehicle having the highest monitoring priority level or a monitoring priority level higher than the threshold with more emphasis than information (an example of second information) indicating the other vehicles. For example, the presentation information may include information for presenting, from among button images 33, button image 33 corresponding to vehicle M1 whose monitoring priority level is high in a form different from button images 33 corresponding to the other vehicles.

Figure 8:
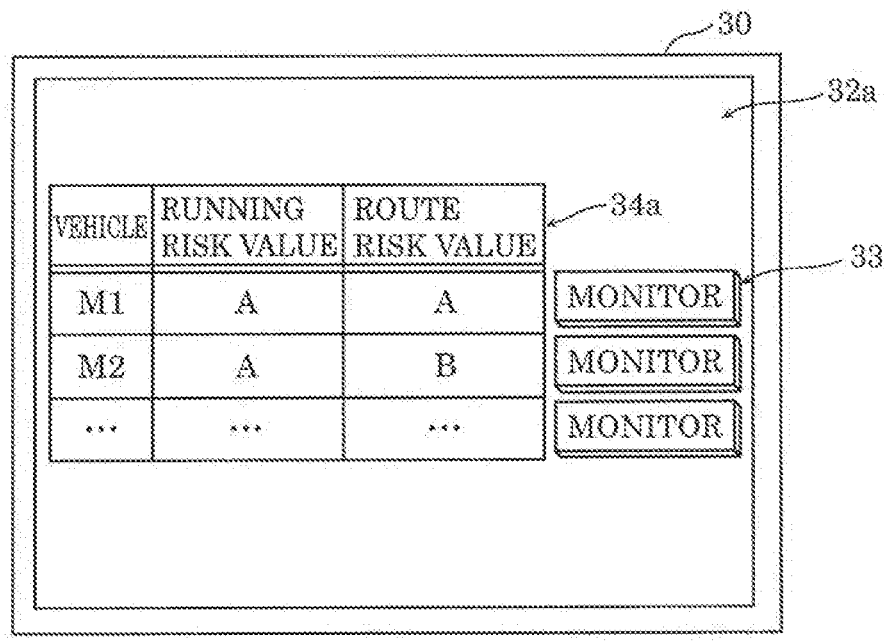
FIG. 8 is an explanatory diagram illustrating a second example of presentation information according to the embodiment.

FIG. 8 is an explanatory diagram illustrating a second example of presentation information according to this embodiment. FIG. 8 illustrates an example in which running risk values and route risk values based on which monitoring priority levels are determined are presented as presentation information.

As illustrated in FIG. 8, image 32a displayed by display device 30 includes image 34a indicating the running risk value and route risk value of each of vehicles M1, etc. That is, video manager 18 causes display device 30 to present image 32a in which vehicles M1, etc. are associated with their running risk values and route risk values. For example, the running risk values and the route risk values are expressed in three levels of A (high), B (medium), and C (low). For example, the running risk value and route risk value of vehicle M1 are A, and the running risk value and route risk value of vehicle M2 are respectively A and B. Image 32a includes image 33 of each of respective buttons for starting monitoring of vehicles M1, etc. The running risk values and the route risk values may be numeric values. For example, the running risk values and the route risk values may each be a value obtained by adding together the priority levels corresponding to the detected items of situation information from among the plurality of items of situation information.

Figure 9:
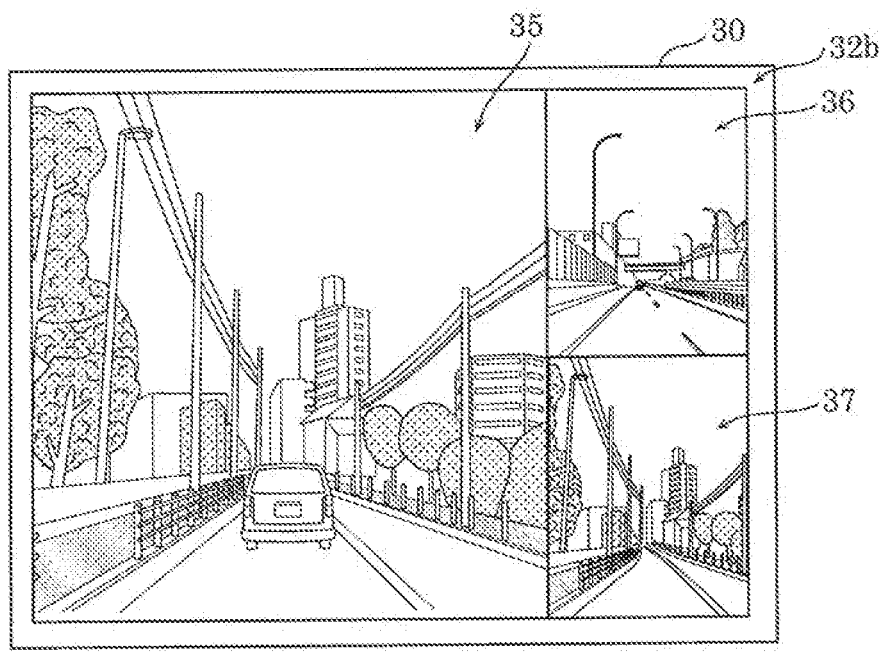
FIG. 9 is an explanatory diagram illustrating a third example of presentation information according to the embodiment.

FIG. 9 is an explanatory diagram illustrating a third example of presentation information according to this embodiment. FIG. 9 illustrates an example in which images based on image data obtained from vehicles M1, etc. are presented as presentation information.

As illustrated in FIG. 9, image 32b displayed by display device 30 includes images 35 to 37 respectively for vehicles M1, etc. For example, image 35 is an image based on image data captured by one or more cameras in vehicle M1 (an example of an attention vehicle) whose monitoring priority level is high. Likewise, images 36 and 37 are each an image based on image data captured by one or more cameras in a vehicle (an example of other vehicle), such as vehicle M2, etc., whose monitoring priority level is lower than that of vehicle M1. Thus, the presentation information may include information for displaying image 35 of vehicle M1 whose monitoring priority level is high in a larger area than each of images 36 and 37 of vehicle M2, etc. whose monitoring priority levels are lower than that of vehicle M1. Image 35 is an example of a first image included in first information, and images 36 and 37 are each an example of a second image included in second information. That is, the presentation information may include information for displaying the first image in a larger area than the second image. Presenting the information (e.g. image 35) indicating the attention vehicle in a larger area than each of the information (image 36 and 37) indicating the other vehicles is included in presenting the information (e.g. image 35) indicating the attention vehicle with more emphasis.

Image 32b may include an image of each of respective buttons (see button images 33 illustrated in FIG. 7) for starting monitoring of vehicles M1, etc.

The monitor visually recognizes image 32, 32a, or 32b, selects a vehicle as a monitoring target, and operates button image 33 corresponding to the selected vehicle. This operation is received by input device 20, and operation information indicating the operation is received by receiver 16.

FIGS. 7 to 9 illustrate examples in which images for the monitor selecting a vehicle as a monitoring target are displayed on display device 30, i.e. automatic switching to an image of a monitoring target is not possible. Examples in which presentation information is information for displaying an image of a vehicle that is a monitoring target of the monitor, i.e. examples in which automatic switching to an image of a monitoring target is possible, will be described below.

Figure 10:
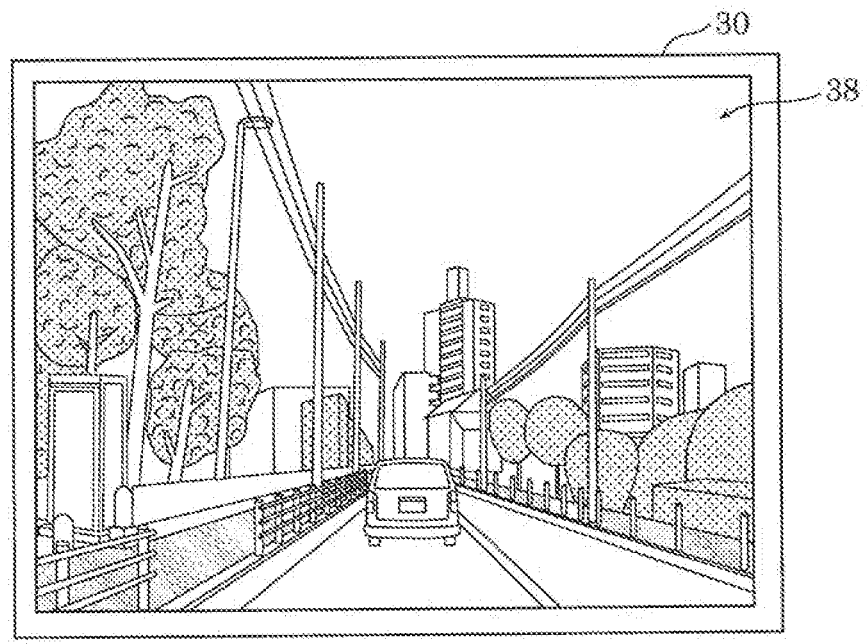
FIG. 10 is an explanatory diagram illustrating a fourth example of presentation information according to the embodiment.

FIG. 10 is an explanatory diagram illustrating a fourth example of presentation information according to this embodiment. FIG. 10 illustrates an example in which an image based on image data obtained from vehicle M1 is presented as presentation information.

As illustrated in FIG. 10, image 38 displayed by display device 30 is an image of vehicle M1 whose monitoring priority level is high (e.g. highest). Thus, the presentation information includes information for monitoring vehicle M1 having the highest monitoring priority level or a monitoring priority level higher than the threshold from among the plurality of vehicles M1, etc. The presentation information includes image 38 (see FIG. 8) captured by vehicle M1 having the highest monitoring priority level or a monitoring priority level higher than the threshold from among the plurality of vehicles M1, etc., or an image showing vehicle M1. In other words, the presentation information includes information indicating a vehicle (e.g. vehicle M1) specified based on the monitoring priority level as a monitoring target, and may include, for example, information for switching an image displayed on display device 30 to image 38 captured by vehicle M1 or an image showing the vehicle. Thus, the work of the monitor to select a monitoring target can be omitted, so that the monitoring load on the monitor can be further reduced.

Figure 11:
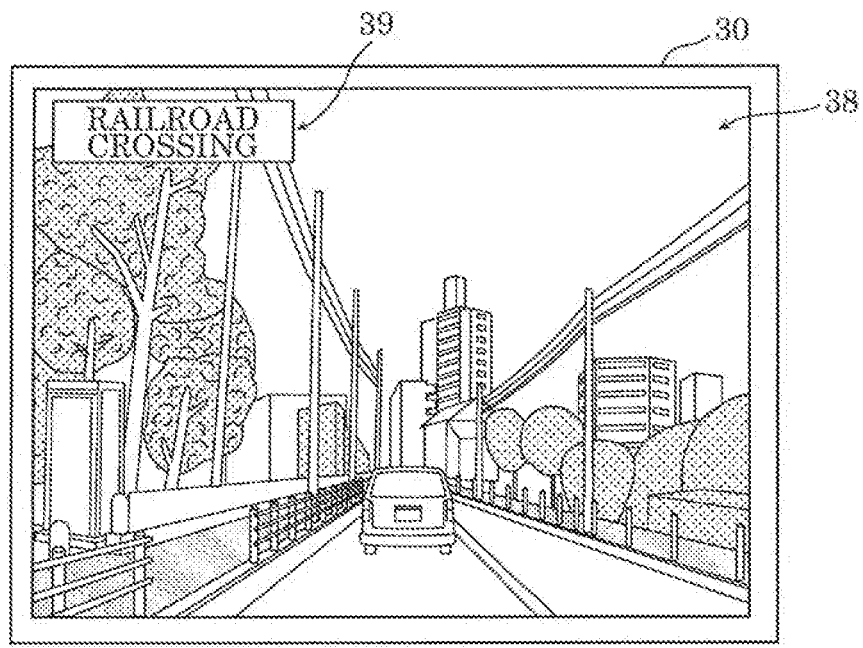
FIG. 11 is an explanatory diagram illustrating a fifth example of presentation information according to the embodiment.

FIG. 11 is an explanatory diagram illustrating a fifth example of presentation information according to this embodiment. FIG. 11 illustrates an example in which a reason for selecting vehicle M1 is presented in image 38 illustrated in FIG. 10. That is, the presentation information includes information indicating the contribution of at least one of the plurality of items of situation information to the monitoring priority level.

As illustrated in FIG. 11, image 38 displayed by display device 30 includes image 39 indicating a reason for determining vehicle M1 as the monitoring target. Image 39 is included in information indicating contribution. The image in FIG. 11 indicates that "railroad crossing" contributes most to the determination of vehicle M1 as the monitoring target. Work information (e.g. work time) corresponding to "railroad crossing" may be superimposed on image 38. In the case where any situation information other than "railroad crossing" is detected, the detected situation information may be presented in a state of being superimposed on image 38. That is, two or more items of situation information corresponding to vehicle M1 may be presented in a state of being superimposed on image 38. In this case, the two or more items of situation information and the priority levels corresponding to the two or more items of situation information may be presented in a state of being superimposed on image 38. The two or more items of situation information and the priority levels are included in information indicating contribution.

Figure 12:
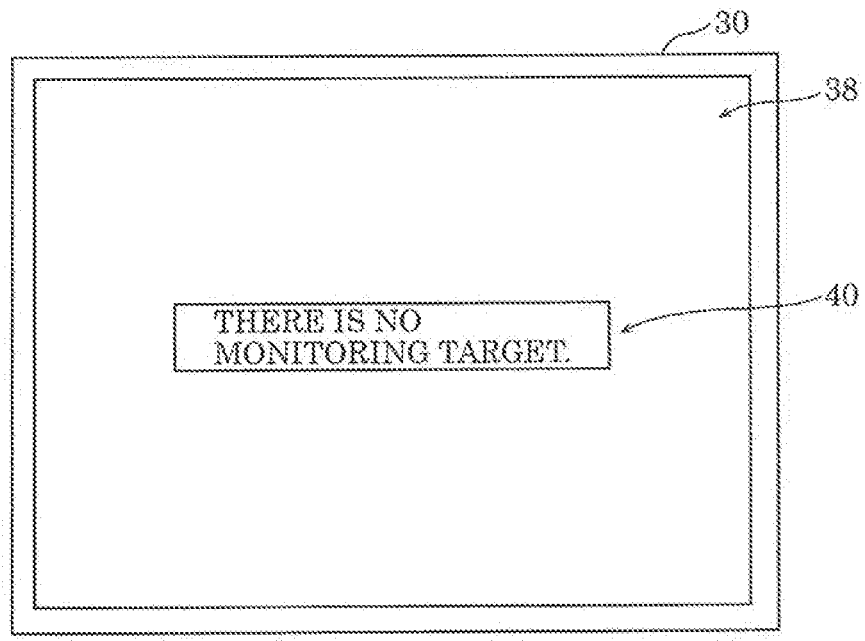
FIG. 12 is an explanatory diagram illustrating a sixth example of presentation information according to the embodiment.

In the case where there is no vehicle whose monitoring priority level is higher than or equal to the predetermined threshold (e.g. in the case where there is no monitoring target vehicle), presentation information indicating that no monitoring is requested may be presented. For example, information indicating that there is no monitoring target, information urging to take a break from monitoring work, or information urging to do work other than monitoring work may be presented. FIG. 12 is an explanatory diagram illustrating a sixth example of presentation information according to this embodiment. Specifically, FIG. 12 illustrates an example in which image 38 including image 40 indicating that there is no monitoring target as the information indicating that no monitoring is requested is displayed.

The time during which there is no vehicle whose monitoring priority level is higher than or equal to the predetermined threshold, i.e. the time during which no monitoring is requested, may be recorded, and statistical information of the time during which no monitoring is requested may be presented. For example, statistical information such as a mean value, a median value, or a mode value of the time during which no monitoring is requested or its distribution in a specific period such as a day, a week, or a month may be presented. A process of recording the time during which no monitoring is requested is performed, for example, by monitoring controller 17. The statistical information may be included in the monitoring information.

From the statistical information of the time during which no monitoring is requested, a suggestion for a period away from monitoring work, such as a break, may be presented. For example, information urging to take a break in a time of day in which the time during which no monitoring is requested is statistically long may be presented. A process of suggesting a period away from monitoring work, such as a break, is performed, for example, by monitoring controller 17. The suggestion (e.g. information urging to take a break) may be included in the monitoring information.

Figure 13:
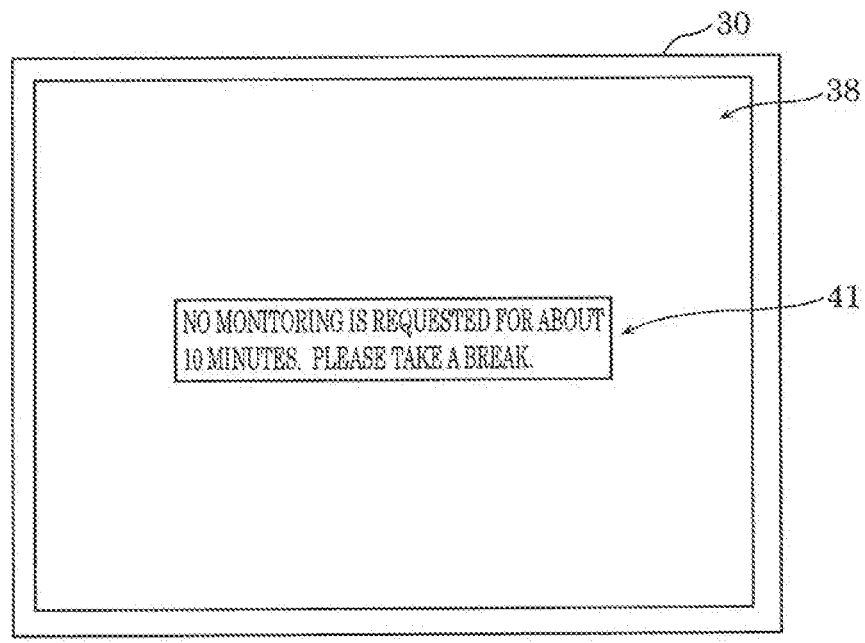
FIG. 13 is an explanatory diagram illustrating a seventh example of presentation information according to the embodiment.

FIG. 13 is an explanatory diagram illustrating a seventh example of presentation information according to this embodiment. Specifically, FIG. 13 illustrates an example in which image 38 including image 41 indicating, as the time during which no monitoring is requested and the information urging to take a break, a mean value of the time during which no monitoring is requested and a suggestion to take a break is displayed.

Operation of Monitoring System

A process by monitoring system 1 having the structure described above will be described below.

Figure 14:
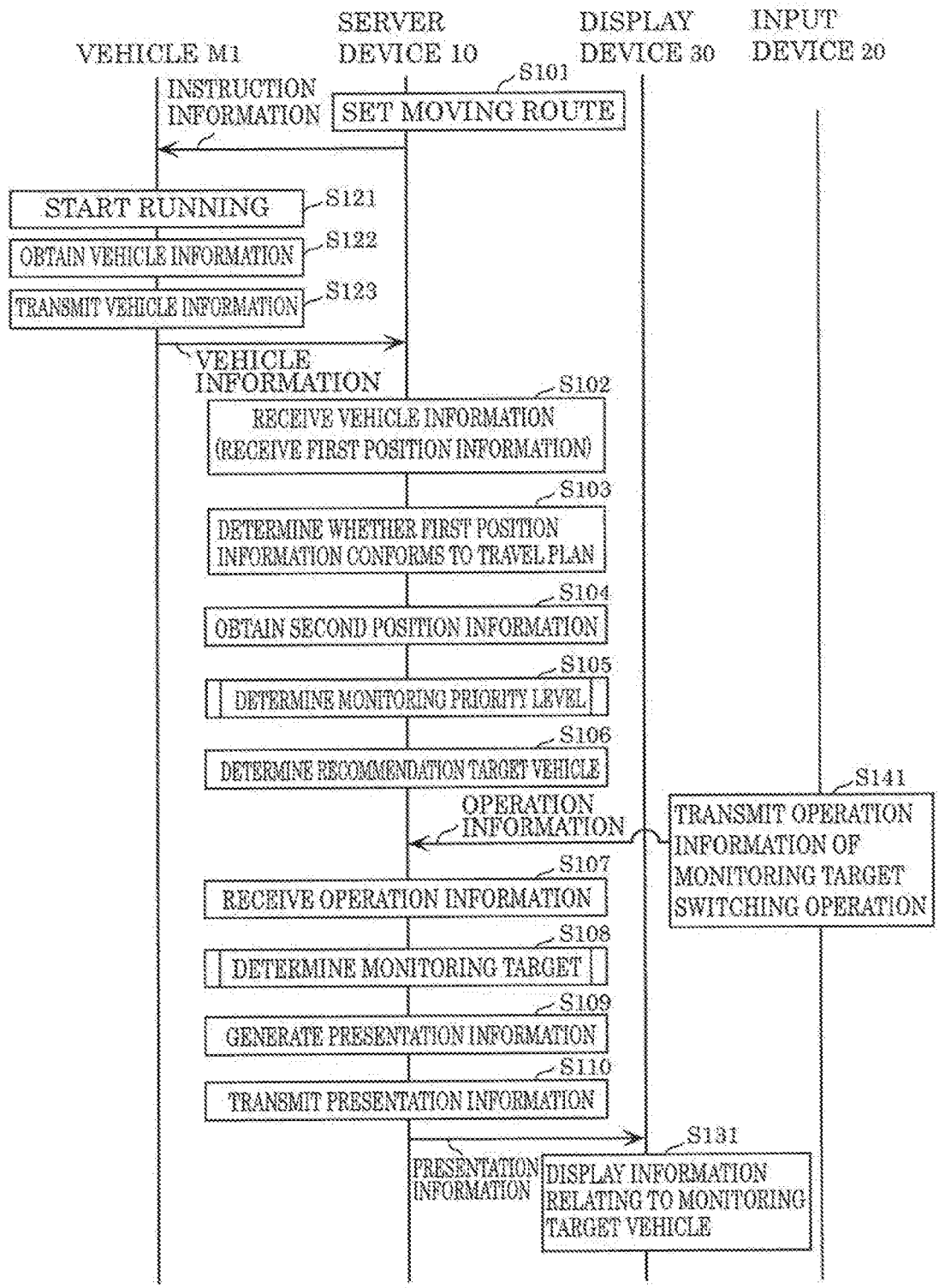
FIG. 14 is a sequence diagram illustrating a process by the monitoring system according to the embodiment.

FIG. 14 is a sequence diagram illustrating a process by monitoring system 1 according to this embodiment. The sequence diagram in FIG. 14 illustrates flow of processing for determining a recommended monitoring target using position information. Although vehicle M1 is used as an example of vehicles M1, etc. in FIG. 14, the same process is performed for other vehicles M2 to MN.

As illustrated in FIG. 14, in Step S101, travel manager 14 in server device 10 sets a moving route of vehicle M1 based on a travel plan of vehicle M1 stored in travel DB 13. Travel manager 14 then transmits instruction information including the set moving route to vehicle M1. For other vehicles M2 to MN, travel manager 14 equally sets a moving route and transmits instruction information.

In Step S121, vehicle M1 receives the instruction information transmitted by travel manager 14 in Step S101. Vehicle M1 runs according to the moving route set by travel manager 14, based on the received instruction information.

In Step S122, vehicle M1 obtains vehicle information (i.e. sensing data and image data) indicating position, speed, acceleration, steering angle, etc. during running.

In Step S123, vehicle M1 transmits the vehicle information (i.e. sensing data and image data) obtained in Step S122, to server device 10. After Step S123, vehicle M1 also obtains vehicle information (i.e. sensing data and image data) indicating position, speed, acceleration, steering angle, etc. during running and transmits the vehicle information to server device 10. The vehicle information includes at least first position information indicating a first position that is the position of vehicle M1.

The processes in Step S121 to S123 are equally performed for other vehicles M2 to MN.

In Step S102, communicator 11 in server device 10 receives the vehicle information (i.e. sensing data and image data) including the first position information transmitted by each of vehicles M1, etc. in Step S123. Communicator 11 provides the received vehicle information (i.e. sensing data and image data) to vehicle manager 12. In Step S102, communicator 11 obtains the vehicle information (i.e. sensing data and image data) through communication.

In Step S103, travel manager 14 in server device 10 determines whether the first position information included in the vehicle information received in Step S102 conforms to the travel plan, and generates travel information indicating the determination result.

In Step S104, recommender 15 in server device 10 obtains second position information indicating a second position from travel manager 14. Specifically, route risk calculator 15b in recommender 15 obtains at least one of geographical information and traffic information from travel manager 14, thus obtaining the second position. Recommender 15 may directly obtain the second position information from travel DB 13.

In Step S105, recommender 15 determines a monitoring priority level for each of the plurality of vehicles M1, etc. Specifically, recommender 15 obtains, from vehicle manager 12, the first position information included in the vehicle information received by communicator 11 in Step S102, obtains the travel information generated by travel manager 14 in Step S103, and further obtains the second position information from travel manager 14 in Step S104.

Recommender 15 then determines the monitoring priority level of the vehicle according to the degree of request for monitoring the vehicle by the monitor based on the obtained vehicle information, travel information, first position information, and second position information. Specifically, running risk calculator 15a in recommender 15 calculates a running risk value based on the obtained vehicle information and travel information and a table (e.g. priority level table T1) stored in travel DB 13. Route risk calculator 15b in recommender 15 calculates a route risk value based on the obtained first position information and second position information. Comprehensive risk calculator 15c determines a comprehensive risk value (an example of a monitoring priority level) based on the running risk value and the route risk value.

In Step S105, recommender 15 suffices to obtain at least the first position information and the second position information. In detail, in Step S105, the monitoring priority level is determined based on at least the route risk value that is based on the first position information and the second position information. In Step S105, the monitoring priority level is determined using the first position information and the second position information for each of the plurality of vehicles M1, etc.

In Step S106, recommender 15 determines a recommendation target vehicle that is requested to be monitored by the monitor, based on the monitoring priority level determined in Step S105. Specifically, recommendation target determiner 15d in recommender 15 may determine a vehicle having the highest monitoring priority level or a monitoring priority level higher than or equal to the predetermined threshold from among the plurality of vehicles M1, etc., as the recommendation target vehicle. The number of recommendation target vehicles determined in Step S106 is not limited to one. From the perspective of reducing the monitoring load on the monitor, however, the number of recommendation target vehicles determined in Step S106 is desirably smaller, and may be, for example, one.

In Step S106, recommender 15 may determine that there is no recommendation target vehicle that is requested to be monitored by the monitor, based on the monitoring priority level determined in Step S105. For example, in the case where there is no vehicle whose monitoring priority level is higher than or equal to the predetermined threshold from among the plurality of vehicles M1, etc., recommender 15 may determine that there is no recommendation target vehicle that is requested to be monitored by the monitor. That is, in Step S106, recommender 15 may determine whether there is a recommendation target vehicle that is requested to be monitored by the monitor, based on the monitoring priority level determined in Step S105.

Recommender 15 then provides recommendation information including information specifying the recommendation target vehicle or information indicating that there is no recommendation target vehicle, to monitoring controller 17.

In Step S141, input device 20 receives operation for switching a monitoring target by the monitor. This operation may be operation based on determination as a result of the monitor visually recognizing information displayed on display device 31 and examining which vehicle is to be a monitoring target. Input device 20 transmits operation information indicating the received operation, to server device 10. The operation information includes information indicating which of vehicles M1, etc. the monitor has switched the monitoring target to. In the case where operation by the monitor has not been performed, input device 20 may transmit, to server device 10, operation information indicating that there is no operation, or transmit no operation information.

In Step S107, receiver 16 in server device 10 receives the operation information transmitted by input device 20 in Step S141.

In Step S108, monitoring controller 17 determines a monitoring target of the monitor, and generates monitoring information for specifying the monitoring target. Here, monitoring controller 17 determines the monitoring target, based on the recommendation information provided by recommender 15 in Step S106 and the operation information received by receiver 16. Monitoring controller 17 provides the generated monitoring information to video manager 18.

In the case where monitoring controller 17 obtains recommendation information including information that there is no recommendation target vehicle, in Step S108, monitoring controller 17 may generate monitoring information including at least one of: information indicating that no monitoring is requested; statistical information of the time during which no monitoring is requested; and a suggestion for a period away from monitoring work, and provide the monitoring information to video manager 18. Monitoring controller 17 may, for example, record the time from when the recommendation information indicating that there is no recommendation target vehicle is obtained to when recommendation information including information specifying a recommendation target vehicle is first obtained, as the time during which no monitoring is requested.

In Step S109, video manager 18 generates presentation information for presentation to the monitor, based on the monitoring information provided from monitoring controller 17 in Step S108.

In Step S110, video manager 18 transmits the presentation information generated in Step S109 to display device 30. In detail, in Steps S109 and S110, video manager 18 generates presentation information for monitoring a vehicle based on the monitoring priority level, and transmits the generated presentation information to display device 30.

In Step S131, display device 30 receives the presentation information transmitted by monitoring controller 17 in Step S109, and displays information relating to a monitoring target vehicle based on the presentation information. In detail, video manager 18 causes display device 30 to output the presentation information, by transmitting the presentation information to display device 30.

In the case where the current operation mode of monitoring controller 17 is the manual update mode, the processes in Steps S107 and S141 may be omitted.

In the case where the monitor is charged with determining monitoring priority from various situations of a plurality of vehicles and determining which vehicle is to be monitored, it is difficult for the monitor to make predictions for the plurality of vehicles and perform determination. According to the presently disclosed techniques, server device 10 automatically changes each priority level according to, for example, a time to reach a high risk location (i.e. a location in which running is difficult), so that the monitor can appropriately select a monitoring target vehicle according to the time before vehicle running becomes difficult. Video manager 18 may cause display device 30 to output the presentation information before vehicle M1 reaches the second position.

Figure 15:
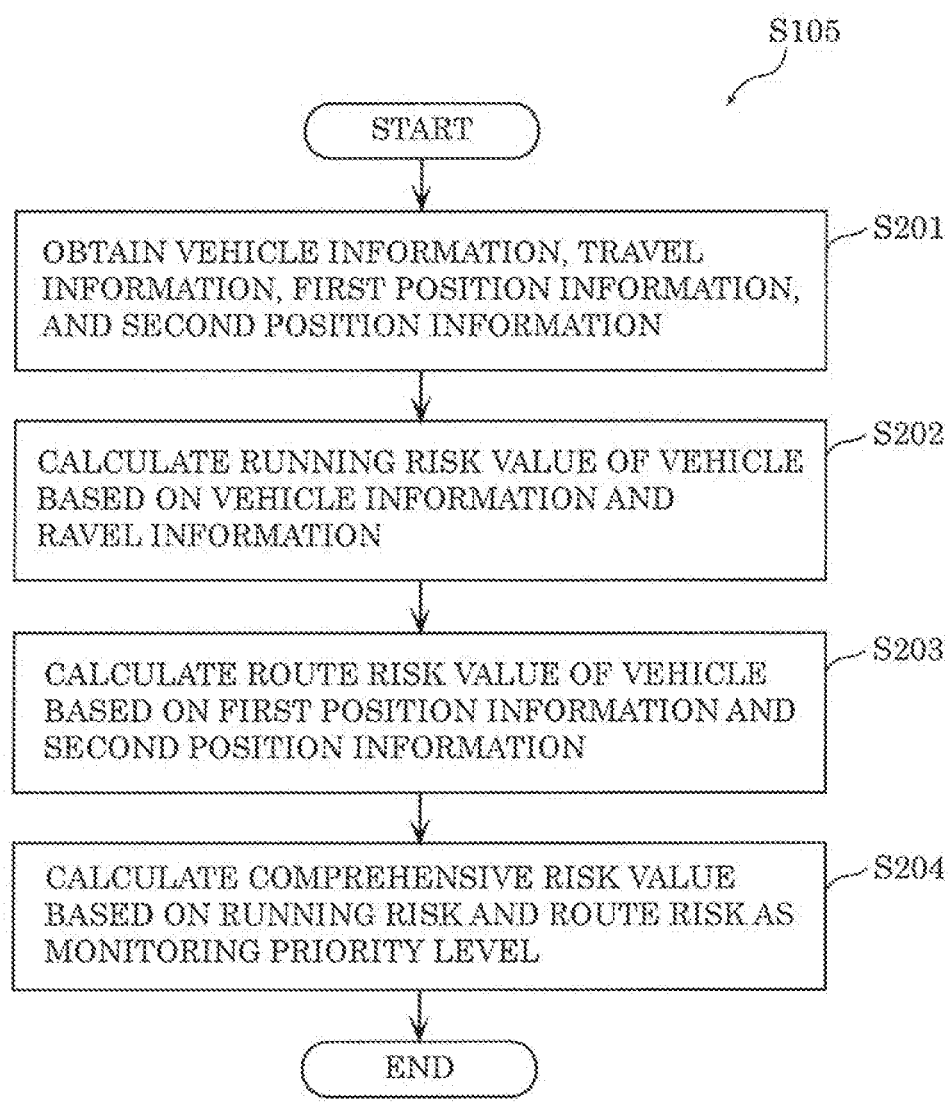
FIG. 15 is a flowchart illustrating a process of determining a monitoring priority level in the recommender according to the embodiment.

FIG. 15 is a flowchart illustrating a process of determining a monitoring priority level in recommender 15 according to this embodiment. FIG. 15 illustrates the details of the process in Step S105 in FIG. 14.

In Step S201, recommender 15 obtains the vehicle information, the travel information, the first position information, and the second position information. Specifically, running risk calculator 15a in recommender 15 obtains the vehicle information from vehicle manager 12, and obtains the travel information from travel manager 14. Route risk calculator 15b in recommender 15 obtains the first position information and the second position information from travel manager 14.

In Step S202, running risk calculator 15a calculates the running risk value of the vehicle based on the vehicle information and the travel information. Specifically, running risk calculator 15a determines the priority level of monitoring of the vehicle based on the vehicle information and the travel information of the vehicle, as the running risk value. In detail, running risk calculator 15a determines the degree of request for monitoring the running of the vehicle by the monitor, based on the vehicle information and the travel information. Running risk calculator 15a determines, as the degree of request for monitoring the vehicle, a priority level corresponding to an item of situation information detected in the vehicle from among the plurality of items of situation information in priority level table T1. In the case where two or more items of situation information are detected from the plurality of items of situation information, for example, running risk calculator 15a determines a value obtained by adding priority levels corresponding to the two or more items of situation information, as a priority level in the running of the vehicle.

For example, when running risk calculator 15a determines that an accident occurs in the vehicle from the running state, camera images, acceleration, and the like, running risk calculator 15a detects "occurrence of accident of own vehicle", and determines the priority level of the vehicle as "23". When recommender 15 obtains a call from an occupant of the vehicle, recommender 15 detects "occurrence of call", and determines the priority level of the vehicle as "18". When recommender 15 determines that the vehicle is located near a railroad crossing from the position information of the vehicle and the geographical information, recommender 15 detects "railroad crossing", and determines the priority level of the vehicle as "4".

In the case where each priority level in priority level table T1 is not a weighted value, in Step S202, the degree of request for monitoring by the monitor may be determined using weights. For example, the degree of request for monitoring by the monitor may be determined by multiplying the priority level corresponding to the situation information by a weight corresponding to the situation information. That is, the degree of request for monitoring by the monitor may be determined through computation. In this case, the weight is a value set beforehand.

The weights corresponding to the plurality of items of situation information may each be determined as appropriate according to, for example, the situation of the vehicle or the surroundings of the vehicle. Each weight may be determined according to information other than the situation information corresponding to the weight. An example of the other information is such information (e.g. the number of objects around the vehicle included in the vehicle information) that causes a change in the degree of request for monitoring by the monitor for the situation information (e.g. "pedestrian crossing") corresponding to the weight. That is, the other information is information that influences the degree of request for monitoring by the monitor in the situation information.

For example, for the situation information "pedestrian crossing" (an example of a first situation information), the degree of request for monitoring by the monitor changes according to the number of objects around the vehicle (i.e. the number of surrounding objects). For example, when the number of surrounding objects (e.g. the number of persons) is larger, the running risk of the vehicle is higher (e.g. the accident occurrence rate is higher), and therefore the degree of request for monitoring by the monitor is higher. Hence, recommender 15 may assign a larger weight to "pedestrian crossing" when the number of surrounding objects is larger. The other information is not limited to the number of surrounding objects included in the vehicle information, and may be situation information (an example of second situation information, such as "sudden start") other than the situation information from among the plurality of items of situation information, the travel information, or a combination thereof. For example, in the case where a vehicle stopped near a pedestrian crossing starts to move, "sudden start" increases the running risk of the vehicle at the pedestrian crossing, and therefore the degree of request for monitoring by the monitor is higher. Hence, recommender 15 may assign a larger weight to "pedestrian crossing" in the case of "sudden start" than in the case of not "sudden start".

Thus, the plurality of items of situation information include the first situation information (e.g. "pedestrian crossing") and the second situation information (e.g. "sudden start") different from the first situation information. The weight corresponding to the first situation information may be determined according to at least one of the second situation information, the vehicle information, and the travel information.

The weights corresponding to the plurality of items of situation information may each be determined according to the time during which the monitor is not responding (e.g. not monitoring) from when the item of situation information is detected. Take the situation information "occurrence of call" as an example. The weight corresponding to the situation information "occurrence of call" may be determined according to the time (hereafter also referred to as "non-response time") during which the monitor is not responding to a call from the occupant of the vehicle from when the call is obtained by server device 10. For example, when the non-response time for "occurrence of call" is longer, the running risk of the vehicle is higher, and therefore the degree of request for monitoring by the monitor is higher. Hence, recommender 15 may assign a larger weight to "occurrence of call" when the non-response time for the call is longer.

The weights corresponding to the plurality of items of situation information may each be determined according to the difference from reference in the situation information. Take the situation information "time schedule slippage" as an example. The weight corresponding to the situation information "time schedule slippage" may be determined according to the time difference (e.g. the delay time from the travel plan) from the travel plan (an example of reference in situation information) set beforehand. For example, when the time difference from the travel plan is greater, the running risk of the vehicle is higher, and therefore the degree of request for monitoring by the monitor is higher. Hence, recommender 15 may assign a larger weight to "time schedule slippage" when the time difference from the travel plan is greater.

As another example of determining the weight according to the difference from the reference value in the situation information is the situation information "speed anomaly" (not illustrated). The weight corresponding to the situation information "speed anomaly" may be determined according to the speed difference from the legal speed (an example of reference in situation information) of the road on which the vehicle is running. For example, when the speed difference from the legal speed is greater, the running risk of the vehicle is higher, and therefore the degree of request for monitoring by the monitor is higher. Hence, recommender 15 may assign a larger weight to "speed anomaly" when the speed difference from the legal speed is greater. The legal speed is obtained, for example, based on the position information of the vehicle and the geographical information.

In Step S203, route risk calculator 15*b* calculates the route risk value of the vehicle based on the first position information and the second position information. Route risk calculator 15*b* determines, as the route risk value, the priority level of monitoring of the vehicle according to movement information relating to the movement of the vehicle from the first position indicated by the first position information to the second position indicated by the second position information. In detail, route risk calculator 15*b* determines the degree of request for monitoring the route of the vehicle by the monitor, based on the first position information and the second position information. For example, in the case where the movement information is travel time, route risk calculator 15*b* determines a higher priority level when the travel time is shorter. Route risk calculator 15*b* may, for example, obtain the geographical information from travel manager 14, and determine the priority level in the route based on the priority level of the second position included in the obtained geographical information and the travel time. For example, in the case where situations indicated by two or more items of situation information occur in the second position, such as in the case where traffic congestion occurs in a junction location, route risk calculator 15*b* may determine a higher priority level than in the case where only one of the situations occurs. Thus, route risk calculator 15*b* may determine the priority level in the route according to the number of situations in the second position.

The second position may be a location in which an object that satisfies the predetermined condition, such as a vehicle involved in an accident or an emergency vehicle, is situated. In this case, route risk calculator 15*b* may obtain the vehicle information from vehicle manager 12, and specify an object that satisfies the predetermined condition from sensing data included in the obtained vehicle information. Route risk calculator 15*b* may then set the location in which the specified object is situated, as the second position. For example, in the case of calculating the route risk value of vehicle M1, route risk calculator 15*b* may specify the second position using sensing data obtained from vehicle M1, or specify the second position using sensing data of a vehicle around vehicle M1.

In Step S204, comprehensive risk calculator 15*c* calculates the comprehensive risk value based on the running risk value and the route risk value, as the monitoring priority level. Specifically, comprehensive risk calculator 15*c* determines the monitoring priority level of the vehicle, by combining the priority level calculated as the running risk value and the priority level calculated as the route risk value through computation. Comprehensive risk calculator 15*c* may, for example, determine the monitoring priority level by adding or multiplying the priority level calculated as the running risk value and the priority level calculated as the route risk value. Comprehensive risk calculator 15*c* may perform addition or multiplication after weighting at least one of the two priority levels.

As described above, in the case where a location with a high risk of occurrence of a situation that is requested to be handled is on the route, i.e. in the case where the second position is on the route, recommender 15 calculates the travel time or the distance (an example of movement information) to reach the second position, and varies the monitoring priority level according to the calculated travel time or distance. That is, in the case where there are a plurality of vehicles, recommender 15 determines monitoring priority based on movement information.

Route risk calculator 15*b* may further obtain a difficulty level of running in the second position, and determine the priority level in the route of the vehicle according to the obtained difficulty level and the travel time. For example, route risk calculator 15*b* may read a table (not illustrated) associating situations in the second position and difficulty levels of running with each other from travel DB 13, to obtain the difficulty level of running. For example, work information table T2 illustrated in FIG. 5 may include difficulty level-related information. A higher difficulty level may be set when the work time in work information table T2 is longer. Route risk calculator 15*b* determines a higher priority level when the difficulty level of running is higher.

The difficulty level of running indicates the degree of difficulty in running by automatic driving, and may include, for example, a difficulty level for a road state that differs from normal. For example, a high difficulty level of running may be set in the case where there is a need to take detour or run one way due to construction.

Route risk calculator 15*b* may further obtain work information relating to monitoring work in the second position, and determine the priority level in the route of the vehicle according to the obtained work information and the movement information. In the case where the movement information includes the travel time and the work information includes the work time (e.g. see FIG. 5), route risk calculator 15*b* may determine the priority level according to the travel time and the work time. For example, route risk calculator 15*b* may determine a higher priority level when the travel time is shorter or the work time is longer. Route risk calculator 15*b* may determine a higher priority level when the difference between the travel time and the work time (specifically, a value obtained by subtracting the work time from the travel time, which is also referred to as "allowance time") is smaller. Route risk calculator 15*b* may determine the priority level in the route by weighting, according to the allowance time, the priority level (e.g. priority level obtained from geographical information) corresponding to the situation in the second position.

Thus, the monitor can monitor the vehicle, with a necessary time being secured before the vehicle reaches the second position. For example, the monitor can recognize the situation of the vehicle before the vehicle reaches the second position, and perform operation when necessary. Accordingly, the monitor can monitor the target vehicle more appropriately. In the case where the allowance time is minus, route risk calculator 15b may output information indicating that the allowance time is minus. In the case where the allowance time is minus, recommendation target determiner 15d may determine the vehicle as a recommendation target vehicle.

Route risk calculator 15b may further obtain the difficulty level of running in the second position, and determine the priority level according to the allowance time, i.e. the difference between the travel time and the work time, and the difficulty level. For example, route risk calculator 15b may determine a higher priority level when the allowance time is shorter or the difficulty level is higher. Route risk calculator 15b may determine the priority level in the route by weighting, according to the allowance time and the difficulty level, the priority level (e.g. priority level obtained from geographical information) corresponding to the situation in the second position.

Communicator 11 or vehicle manager 12 is an example of a first obtainer that obtains first position information, and travel manager 14 is an example of a second obtainer that obtains second position information.

Figure 16:
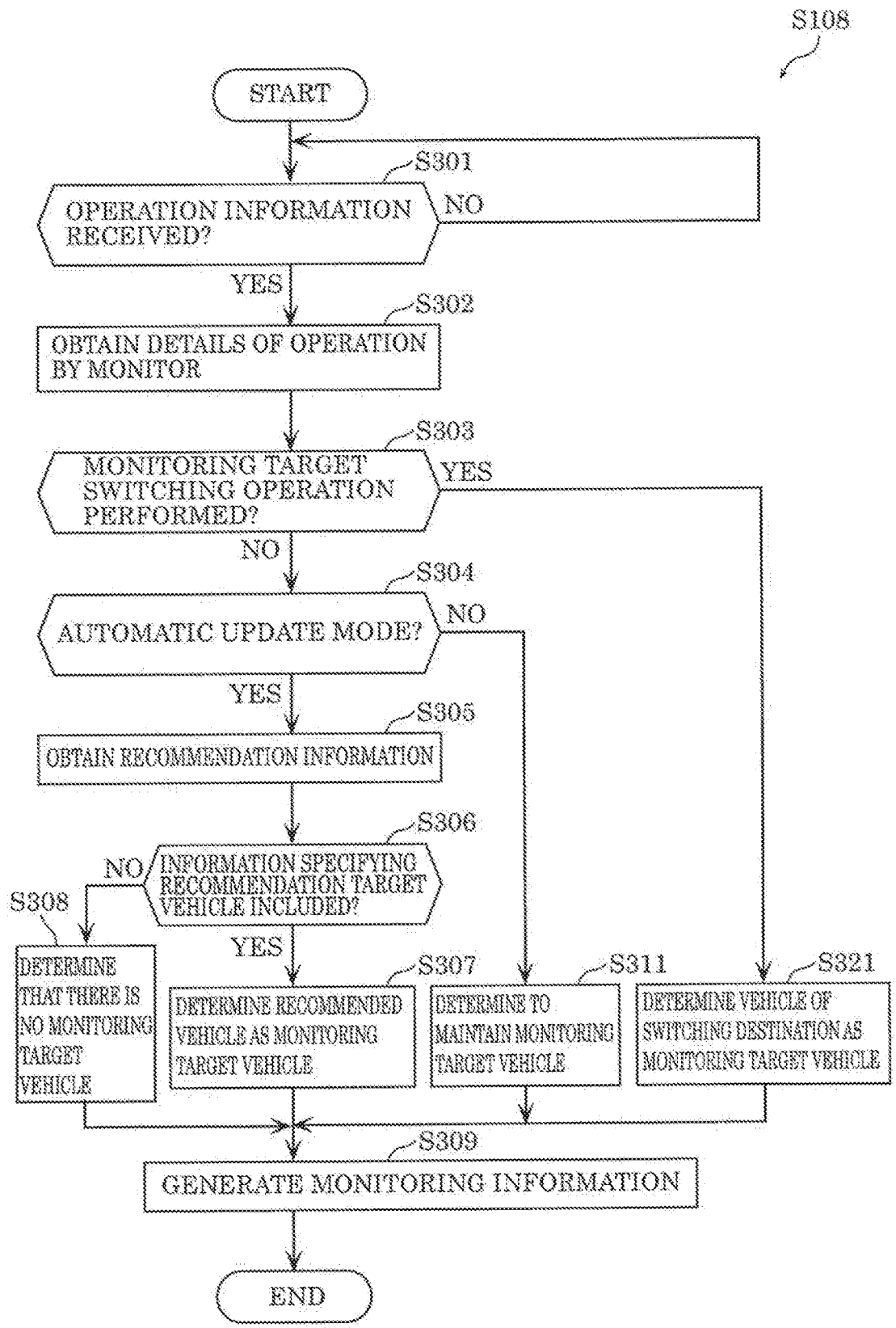
FIG. 16 is a flowchart illustrating a process by a monitoring controller according to the embodiment.

FIG. 16 is a flowchart illustrating a process by monitoring controller 17 according to this embodiment. FIG. 16 illustrates the details of the process in Step S108 in FIG. 14.

In Step S301, monitoring controller 17 determines whether receiver 16 receives operation information from input device 20. In the case where monitoring controller 17 determines that operation information is received (Step S301: Yes), the process advances to Step S302. Otherwise (Step S301: No), Step S301 is performed again. Thus, monitoring controller 17 is in a standby state in Step S301 until operation information is received.

In Step S302, monitoring controller 17 obtains operation by the monitor, based on the operation information received by receiver 16.

In Step S303, monitoring controller 17 determines whether monitoring target switching operation is performed. In the case where monitoring controller 17 determines that the operation is performed (Step S303: Yes), the process advances to Step S321. In the case where monitoring controller 17 determines that the operation is not performed (Step S303: No), the process advances to Step S304.

In Step S304, monitoring controller 17 determines whether the current operation mode is the automatic update mode. In the case where the current operation mode is the automatic update mode (Step S304: Yes), the process advances to Step S305. Otherwise (Step S304: No), the process advances to Step S311.

In Step S305, monitoring controller 17 obtains the recommendation information provided from recommender 15 in Step S106.

In Step S306, monitoring controller 17 determines whether the recommendation information includes information specifying a recommendation target vehicle. In the case where the recommendation information includes information specifying a recommendation target vehicle (S306: Yes), i.e. in the case where recommender 15 determines that there is a recommendation target vehicle, the process advances to Step S307. Otherwise (Step S306: No), the process advances to Step S308.

In Step S307, monitoring controller 17 determines the recommendation target vehicle recommended in the recommendation information, as a monitoring target vehicle.

In Step S308, monitoring controller 17 determines that there is no monitoring target vehicle, based on the recommendation information.

In Step S311, monitoring controller 17 determines to maintain the current monitoring target vehicle.

In Step S321, monitoring controller 17 determines the vehicle of the switching destination of the switching operation by the monitor, as the monitoring target vehicle.

In Step S309, monitoring controller 17 generates monitoring information indicating the monitoring target, based on the determination in Step S307, S308, S311, or S321. After the process in Step S309, the series of processes in FIG. 16 ends. The monitoring information generated in Step S309 is provided to video manager 18 and used in the process in Step S109.

Although the above describes the case where recommender 15 recommends a vehicle as a monitoring target, recommender 15 may further recommend how to monitor the vehicle. For example, "how to monitor the vehicle" includes: monitoring how fast the vehicle is running; and in which direction with respect to the vehicle monitoring is performed. In this case, the recommendation information includes not only information specifying the vehicle, but also information specifying how to monitor the vehicle. In the case where the monitoring information further includes information specifying a method of monitoring the vehicle, video manager 18 includes, in the presentation information, data corresponding to the monitoring method from among the image data and sensing data received by communicator 11 from the vehicle, to present the information to the monitor. More specifically, in the case of recommending, as the vehicle monitoring method, in which direction with respect to the vehicle monitoring is performed, video manager 18 may include, in the presentation information, an image obtained by a camera in the direction of the monitoring target from among one or more cameras in the vehicle.

Variation of Embodiment

An information processing method, etc. according to a variation will be described below, with reference to FIG. 17. The structure of a monitoring system according to this variation is the same as that in the embodiment, and accordingly its description is omitted.

FIG. 17 is a sequence diagram illustrating a process by monitoring system 1 according to this variation. Although vehicles M1 and M2 are used as an example of vehicles M1, etc. in FIG. 17, the same process is performed for the other vehicles. FIG. 17 illustrates an example in which server device 10 obtains vehicle information and the like from vehicles M1 and M2. Steps S401 to S410 performed by server device 10 are the same as Steps S101 to S110 in FIG. 14, and their description is omitted. Steps S421 to S423 performed by vehicle M1 and Steps S424 to S426 performed by vehicle M2 are the same as Steps S121 to S123 in FIG. 14, and their description is omitted. Step S431 performed by display device 30 is the same as Step S131 in FIG. 14, and its description is omitted. Step S441 performed by input device 20 is the same as Step S141 in FIG. 14, and its description is omitted. In the following description, it is assumed that vehicle M1 is determined as a monitoring target from among vehicles M1, etc. in Step S408.

In Step S411, server device 10 transmits communication traffic control information for controlling the communication traffic with a vehicle, to vehicle M2. That is, server device 10 transmits the communication traffic control information to vehicle M2 not determined as the monitoring target in Step S408. The communication traffic control information is information for reducing the communication traffic between vehicle M2 and server device 10.

The communication traffic between vehicle M2 and server device 10 is controlled according to the monitoring priority level. The monitoring priority level of vehicle M2 is lower than the monitoring priority level of vehicle M1. Accordingly, server device 10 may generate the communication traffic control information so that the communication traffic between vehicle M2 and server device 10 will be lower than the communication traffic between vehicle M1 and server device 10. Server device 10 may generate the communication traffic control information so that the communication traffic between vehicle M2 and server device 10 will be lower after the determination of the monitoring target than before the determination of the monitoring target.

In the case where vehicle M1 is determined as the monitoring target, the communication traffic control information is transmitted to all of the plurality of vehicles M1, etc. other than vehicle M1 (also referred to as "other vehicles"). The communication traffic control information transmitted to each of the other vehicles may be determined according to the monitoring priority level of the vehicle. Control may be performed so that the communication traffic of a vehicle low in monitoring priority level among the other vehicles will be lower than the communication traffic of a vehicle high in monitoring priority level among the other vehicles. Thus, while reducing the communication traffic between server device 10 and the other vehicles, more information can be transmitted for a vehicle having a high possibility of becoming a monitoring target hereafter from among the other vehicles. Alternatively, server device 10 may uniformly reduce the communication traffic of the other vehicles.

In Step S427, vehicle M2 receives the communication traffic control information.

In Step S428, vehicle M2 changes the communication traffic with server device 10 based on the received communication traffic control information. Vehicle M2 may reduce the communication traffic, by at least one of lowering the image quality of image data transmitted from vehicle M2, lowering the communication speed of transmitting image data, and lowering the frame rate for capturing image data. In the case where vehicle M2 includes two or more cameras for capturing the surroundings of vehicle M2, vehicle M2 may reduce the communication traffic by transmitting only image data captured by a predetermined camera to server device 10. The predetermined camera is, for example, a camera that is determined according to the moving route of vehicle M2 or the like and captures an image in the traveling direction of vehicle M2.

The process in Step S411 may be performed by any of the structural elements included in server device 10. For example, monitoring controller 17 or video manager 18 may perform the process in Step S411. For example, video manager 18 may transmit the communication traffic control information to vehicle M2 via communicator 11 after transmitting the presentation information to display device 30.

Other Embodiments

While the presently disclosed techniques have been described by way of the foregoing embodiment and variation (hereafter also referred to as "embodiment, etc."), the present disclosure is not limited to the foregoing embodiment, etc.

For example, although the foregoing embodiment, etc. describe an example in which a vehicle selected by operation by the monitor is determined as a monitoring target vehicle with priority over a recommendation target vehicle of the recommender, the present disclosure is not limited to this. The recommendation target may be determined as a monitoring target vehicle with priority over the vehicle selected by operation by the monitor. For example, the monitoring controller may preferentially determine the recommendation target vehicle as the monitoring target vehicle in the case where the monitoring priority level is higher than or equal to a predetermined value.

Although the foregoing embodiment, etc. describe an example in which the recommendation target determiner in the recommender determines a vehicle having the highest monitoring priority level or a monitoring priority level higher than or equal to the threshold as a recommendation target vehicle, the present disclosure is not limited to this. For example, the recommender may determine a vehicle for which predetermined situation information from among the plurality of items of situation information is detected, as a recommendation target vehicle. As an example, a vehicle for which the situation information "occurrence of accident of own vehicle" is detected may be determined as a recommendation target vehicle. The recommendation target determiner may, for example, determine a vehicle for which an allowance time of less than or equal to a predetermined time is detected, as a recommendation target vehicle.

In the foregoing embodiment, etc., in the case where there are a plurality of monitors, the recommender may change each priority level or priority order depending on the state of each monitor. Take "junction" illustrated in FIG. 5 as an example. Suppose monitor A handled "junction" more times than monitor B in the past. In this case, monitor A can handle "junction" more smoothly than monitor B. Hence, the work time of monitor A for "junction" may be shorter than that of monitor B. For example, when monitoring for "junction" is requested in the case where there are a plurality of monitors, monitoring controller 17 may preferentially assign the monitoring to a monitor whose work time is shorter. Thus, in the case where there are a plurality of monitors, a monitor capable of smoothly handling a situation of situation information in the second position can monitor the vehicle.

Although the foregoing embodiment, etc. describe an example in which, in the case where two or more items of situation information are detected from among the plurality of items of situation information, the running risk calculator determines a value obtained by adding together the priority levels corresponding to the two or more items of situation information as the priority level in the running of the vehicle, the present disclosure is not limited to this. The running risk calculator may determine a statistical value such as a mean value, a median value, a maximum value, or a minimum value of the two or more priority levels corresponding to the two or more items of situation information, as the priority level in the running of the vehicle (running risk value).

Although the foregoing embodiment, etc. describe an example in which, in the case where the number of items of information in the second position is two or more, the running risk calculator determines a value obtained by adding together the priority levels corresponding to the two or more items of situation information as the priority level in the route of the vehicle, the present disclosure is not limited to this. The route risk calculator may determine a statistical value such as a mean value, a median value, a maximum value, or a minimum value of the two or more priority levels corresponding to the two or more items of situation information, as the priority level in the route of the vehicle (route risk value).

In the foregoing embodiment, etc., the priority level in the running and the priority level in the route may be determined, for example, using a machine learning model. In this case, a machine learning model learned using learning data is implemented in the recommender. The recommender may obtain a priority level output as a result of inputting the obtained vehicle information and travel information to the machine learning model as input data, as the priority level in the running. The recommender may obtain a priority level output as a result of inputting the obtained first position information and second position information to the machine learning model as input data, as the priority level in the route.

Each priority level in the priority level table or each difficulty level of running in the foregoing embodiment, etc. may be, for example, determined as appropriate depending on a situation around the second position. The route risk calculator may correct each priority level in the priority level table or determine each difficulty level of running, depending on the number of surrounding objects (including pedestrians, bicycles, etc.) around the second position or the type(s) of the surrounding object(s). The route risk calculator may set a higher priority level or difficulty level when the number of surrounding objects around the second position is larger.

In the foregoing embodiment, etc., the vehicle information includes a plurality of types. Each of the plurality of types of vehicle information may be associated with a weight. For example, each of steering angle and speed (an example of vehicle information) may be associated with a weight. The monitoring priority level may then be determined based on the weight.

The monitoring priority level may be determined using not only information of the monitoring target vehicle but also information of other vehicles. Specifically, the monitoring controller obtains movement information of each vehicle other than the monitoring target vehicle, and determines whether the other vehicle is heading toward the second position that is the moving destination of the monitoring target vehicle or is on the moving route of the monitoring target vehicle. In the case where the monitoring controller determines that the other vehicle is heading toward the second position, the monitoring controller determines a higher monitoring priority level than in the case where the other vehicle is not heading toward the second position. Further, the monitoring controller may determine the monitoring priority level, according to the difference between the time for the other vehicle heading toward the second position to reach the second position and the time for the monitoring target vehicle to reach the second position. The other vehicle may also be a monitoring target.

The method of communication between the devices in the monitoring system according to the foregoing embodiment, etc. is not limited. Communication between the devices may be wireless communication or wire communication. Communication between the devices may be a combination of wireless communication and wire communication.

The processing units (vehicle manager, travel manager, recommender, etc.) in the monitoring system according to the foregoing embodiment, etc. are typically implemented as LSI which is an integrated circuit. These processing units may be individually formed into one chip, or part or all thereof may be included in one chip.

The circuit integration technique is not limited to LSI, and dedicated circuits or general-purpose processors may be used to achieve the same. A field programmable gate array (FPGA) which can be programmed after manufacturing the LSI, or a reconfigurable processor where circuit cell connections and settings within the LSI can be reconfigured, may be used.

In the foregoing embodiment, etc., each of the structural elements may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or semiconductor memory.

The numeric values described above are mere examples to illustrate the presently disclosed techniques in detail, and the present disclosure is not limited to such.

The division of the functional blocks in each block diagram is an example, and a plurality of functional blocks may be realized as one functional block, one functional block may be divided into a plurality of functional blocks, or part of functions may be transferred to another functional block. Moreover, functions of a plurality of functional blocks having similar functions may be realized by single hardware or software in parallel or in a time-sharing manner.

Although the foregoing embodiment, etc. describe the case where the server device is a single device, the server device may be implemented by a plurality of devices connected to each other.

The order in which the steps are performed in each flowchart is an example provided for specifically describing the presently disclosed techniques, and order other than the above may be used. Part of the steps may be performed simultaneously (in parallel) with other steps.

Other modifications obtained by applying various changes conceivable by a person skilled in the art to the foregoing embodiment, etc. and any combinations of the structural elements and functions in the foregoing embodiment, etc. without departing from the scope of the present disclosure are also included in the present disclosure.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The presently disclosed techniques can be used for an information processing method whereby a monitor monitors an operated vehicle.

What is claimed is:

1. An information processing method performed using a computer, the information processing method comprising:

obtaining first position information indicating a first position, the first position being a position of a vehicle that is a monitoring target;

obtaining second position information indicating a second position, the second position being a position that is on a running route of the vehicle and that has not yet been reached by the vehicle, and being a position with respect to which monitoring is requested;

determining a monitoring priority level of the vehicle according to movement information relating to movement of the vehicle from the first position to the second position;

generating presentation information for monitoring the vehicle, based on the monitoring priority level; and causing a presentation device to output the presentation information.

2. The information processing method according to claim 1,
wherein the movement information includes at least one of a travel time from the first position to the second position, a distance from the first position to the second position, and a running route from the first position to the second position.

3. The information processing method according to claim 2,
wherein the movement information includes the travel time, and
the determining includes determining the monitoring priority level according to the travel time.

4. The information processing method according to claim 3, further comprising:
obtaining a difficulty level of running in the second position,
wherein the determining includes determining the monitoring priority level according to the difficulty level and the travel time.

5. The information processing method according to claim 1,
wherein the second position includes a location specified from at least one of geographical information and traffic information.

6. The information processing method according to claim 5,
wherein the second position includes a location in which a person gets on or off a vehicle.

7. The information processing method according to claim 1,
wherein the second position includes a location in which an object that satisfies a predetermined condition is situated.

8. The information processing method according to claim 7,
wherein the predetermined condition includes a condition that the object has a possibility of obstructing running of the vehicle, and
the information processing method comprises:
specifying the object from sensing data of the vehicle or a vehicle around the vehicle.

9. The information processing method according to claim 2, further comprising:
obtaining work information relating to work of a monitor according to a difficulty level of running in the second position,
wherein the determining includes determining the monitoring priority level according to the movement information and the work information.

10. The information processing method according to claim 9,
wherein the work information includes a work time that is at least one of a work time required to monitor the vehicle and a work time required to operate the vehicle,
the movement information includes the travel time, and
the determining includes determining the monitoring priority level according to the travel time and the work time.

11. The information processing method according to claim 10, further comprising:
obtaining the difficulty level of running in the second position,
wherein the determining includes determining the monitoring priority level according to a difference between the travel time and the work time and the difficulty level.

12. The information processing method according to claim 1,
wherein the obtaining of the first position information includes obtaining the first position information from each of a plurality of the vehicles,
the obtaining of the second position information includes obtaining, for each of the plurality of the vehicles, the second position information indicating the second position that is the position in which the vehicle is requested to be monitored,
the determining includes determining, for each of the plurality of the vehicles, the monitoring priority level using the first position information and the second position information, and
the presentation information includes information for monitoring a vehicle specified according to respective monitoring priority levels of the plurality of the vehicles.

13. The information processing method according to claim 12,
wherein the presentation information includes information indicating, as the monitoring target, the vehicle specified.

14. The information processing method according to claim 12,
wherein the presentation information includes information for presenting the information for monitoring the vehicle specified according to a monitoring priority level thereof from among the plurality of the vehicles with more emphasis than information for monitoring a vehicle other than the vehicle specified.

15. The information processing method according to claim 1,
wherein the obtaining of the first position information includes obtaining the first position information through communication with the vehicle, and
the information processing method further comprises:
controlling communication traffic of the communication according to the monitoring priority level.

16. The information processing method according to claim 1,
wherein the causing includes causing the presentation device to output the presentation information before the vehicle reaches the second position.

17. An information processing system using a computer, the information processing system comprising:
a first obtainer that obtains first position information indicating a first position, the first position being a position of a vehicle that is a monitoring target;

a second obtainer that obtains second position information indicating a second position, the second position being a position that is on a running route of the vehicle and that has not yet been reached by the vehicle, and being a position with respect to which monitoring is requested;

a determiner that determines a monitoring priority level of the vehicle according to movement information relating to movement of the vehicle from the first position to the second position; and a presentation controller that generates presentation information for monitoring the vehicle based on the monitoring priority level, and causes a presentation device to output the presentation information.

\* \* \* \* \*